(12) United States Patent
Dwarakanath et al.

(10) Patent No.: US 11,905,461 B2
(45) Date of Patent: Feb. 20, 2024

(54) METHODS FOR FOAM STIMULATION

(71) Applicant: Chevron U.S.A. Inc., San Ramon, CA (US)

(72) Inventors: Varadarajan Dwarakanath, Houston, TX (US); Taimur Malik, Houston, TX (US); Lin Zuo, Richmond, CA (US); Jimin Daniel Zhou, Richmond, CA (US); Nabijan Nizamidin, Houston, TX (US); Gregory A. Winslow, Houston, TX (US); Reza Banki, Moon, PA (US); Mohamad Salman, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 530 days.

(21) Appl. No.: 16/922,999

(22) Filed: Jul. 7, 2020

(65) Prior Publication Data

US 2021/0002444 A1    Jan. 7, 2021

Related U.S. Application Data

(60) Provisional application No. 62/871,187, filed on Jul. 7, 2019.

(51) Int. Cl.
*E21B 43/16* (2006.01)
*C09K 8/60* (2006.01)
*C09K 8/94* (2006.01)

(52) U.S. Cl.
CPC .............. *C09K 8/602* (2013.01); *C09K 8/94* (2013.01); *E21B 43/166* (2013.01)

(58) Field of Classification Search
CPC .......... C09K 8/602; C09K 8/94; E21B 43/166
See application file for complete search history.

(56) References Cited

U.S. PATENT DOCUMENTS

| | | | |
|---|---|---|---|
| 3,811,504 A | 5/1974 | Haferkamp et al. | |
| 3,811,505 A | 5/1974 | Flournoy et al. | |
| 3,811,507 A | 5/1974 | Flournoy et al. | |
| 3,890,239 A | 6/1975 | Dycus et al. | |
| 4,463,806 A | 8/1984 | Hurd | |
| 5,488,148 A | 1/1996 | Weerasooriya et al. | |
| 6,022,843 A | 2/2000 | Shanks et al. | |
| 6,225,267 B1 | 5/2001 | Eckard et al. | |

(Continued)

FOREIGN PATENT DOCUMENTS

| | | |
|---|---|---|
| WO | 2008/079855 | 7/2008 |
| WO | 2011/094442 | 8/2011 |

(Continued)

OTHER PUBLICATIONS

SPE 129766, Barnes, Julian Richard, et al. "Application of internal olefin sulfonates and other surfactants to EOR. Part 1: Structure-Performance relationships for selection at different reservoir conditions." SPE improved oil recovery symposium. Society of Petroleum Engineers, 2010.

(Continued)

*Primary Examiner* — Silvana C Runyan
(74) *Attorney, Agent, or Firm* — Meunier Carlin & Curfman LLC

(57) ABSTRACT

Disclosed are foam precursor compositions, foamed compositions, and methods of using these foamed compositions for the stimulation of unconventional reservoirs.

13 Claims, 10 Drawing Sheets

(56) References Cited

U.S. PATENT DOCUMENTS

| | | |
|---|---|---|
| 7,629,299 B2 | 12/2009 | Berger et al. |
| 7,770,641 B2 | 8/2010 | Dwarakanath et al. |
| 8,211,837 B2 | 7/2012 | Weerasooriya et al. |
| 9,422,469 B2 | 8/2016 | Dwarakanath et al. |
| 9,605,198 B2 | 3/2017 | Shong et al. |
| 9,617,464 B2 | 4/2017 | Dwarakanath et al. |
| 9,840,898 B2 | 12/2017 | Kasevich et al. |
| 9,890,627 B2 | 2/2018 | Kasevich et al. |
| 9,976,072 B2 | 5/2018 | Shong et al. |
| 10,266,750 B2 | 4/2019 | Oghena et al. |
| 2005/0199395 A1 | 9/2005 | Berger et al. |
| 2006/0185845 A1 | 8/2006 | Shpakoff et al. |
| 2006/0189486 A1 | 8/2006 | Shpakoff et al. |
| 2007/0191633 A1 | 8/2007 | Berger et al. |
| 2009/0112014 A1 | 4/2009 | Campbell et al. |
| 2009/0205823 A1* | 8/2009 | Mohanty ............... C09K 8/594 166/270.1 |
| 2009/0270281 A1 | 10/2009 | Steinbrenner et al. |
| 2010/0004843 A1 | 1/2010 | Yu et al. |
| 2010/0292110 A1 | 11/2010 | Pope et al. |
| 2010/0319920 A1 | 12/2010 | Pope et al. |
| 2011/0046024 A1 | 2/2011 | Campbell et al. |
| 2011/0048721 A1 | 3/2011 | Pope et al. |
| 2011/0059872 A1 | 3/2011 | Weerasooriya et al. |
| 2011/0059873 A1 | 3/2011 | Weerasooriya et al. |
| 2011/0071057 A1 | 3/2011 | Weerasooriya et al. |
| 2011/0100402 A1 | 5/2011 | Soane et al. |
| 2011/0190174 A1 | 8/2011 | Weerasooriya et al. |
| 2011/0190175 A1 | 8/2011 | Steinbrenner et al. |
| 2011/0201531 A1 | 8/2011 | Sharma et al. |
| 2014/0288909 A1 | 9/2014 | Prestwood et al. |
| 2016/0281494 A1 | 9/2016 | Shirdel et al. |
| 2016/0347990 A1* | 12/2016 | Vanzin ................... C09K 8/602 |
| 2017/0030819 A1* | 2/2017 | McCarty ................ C09K 8/605 |
| 2017/0198202 A1* | 7/2017 | Shong .................... C09K 8/588 |
| 2018/0031462 A1* | 2/2018 | Dwarakanath .......... E21B 43/16 |
| 2018/0202273 A1 | 7/2018 | Kasevich et al. |
| 2019/0264097 A1* | 8/2019 | Dusterhoft .......... E21B 43/2605 |
| 2019/0330942 A1 | 10/2019 | King et al. |

FOREIGN PATENT DOCUMENTS

| | | |
|---|---|---|
| WO | 2012/027757 | 3/2012 |
| WO | 2018/075237 | 4/2018 |
| WO | 2019/005289 | 1/2019 |
| WO | 2019028083 | 2/2019 |
| WO | 2019028085 | 2/2019 |
| WO | 2019028086 | 2/2019 |

OTHER PUBLICATIONS

URTecC: 2881265, Gala, et al., "Modeling of Fluid Injection in Depleted Parent Wells to Minimize Damage due to Frac-Hits", Unconventional Resources Technology Conference (URTeC) held in Houston, Texas, 2018.

Patil, P.D., et al., "CO2 Foam Field Pilot Test in Sandstone Reservoir: Complete Analysis of Foam Pilot Response", SPE Improved Oil Recovery Conference, SPE-190312-MS, Apr. 14, 2018.

CSUG/SPE 136757 Vincent, M.C., "Restimulation of Unconventional Reservoirs: When are Refracs Beneficial?" Paper presented at the Canadian Unconventional Resources and International Petroleum Conference, Calgary, Alberta, Canada, Oct. 2010.

* cited by examiner

METHODS FOR FOAM STIMULATION

CROSS-REFERENCE TO RELATED APPLICATIONS

This application claims benefit of priority of U.S. Provisional Application No. 62/871,187 filed Jul. 7, 2019, which is incorporated by reference herein in its entirety.

BACKGROUND

Many oil and gas wells have declined or depleted to the point of being marginally economical. As wells age, multiple mechanisms contribute to the production decline. In addition to mechanical failures of a well's infrastructure, formation damage can accelerate the production decline of an existing well. Formation damage can take various forms, including (1) fines migration, mechanically induced by flow velocity; (2) scaling, precipitates, paraffins/asphaltenes and clay swelling; (3) water or condensate block; and fracturing (frac) interaction.

Improved methods for increasing production from these existing oil and gas wells are needed.

SUMMARY

Disclosed herein are methods for stimulating an unconventional subterranean formation. These methods can comprise (a) providing the existing wellbore in fluid communication with an unconventional subterranean formation, wherein the existing wellbore has a pressure that is less than original reservoir pressure; (b) injecting a foamed composition through the existing wellbore into the unconventional subterranean formation, (c) allowing foamed composition to contact a rock matrix of the unconventional subterranean formation for a period of time; and (d) producing fluids from the unconventional subterranean formation through the wellbore. The foamed composition can comprise a surfactant package comprising a primary foaming surfactant and optionally one or more secondary surfactants. A region of the unconventional subterranean formation in fluid communication with the existing wellbore can be a naturally fractured, can have been previously fractured one or more times (e.g., fractured, or fractured and refractured one or more times), or any combination thereof.

Also provided are aqueous foam precursor compositions that can be foamed with an expansion gas to form foamed compositions for use in the stimulation methods described herein. The aqueous foam precursor compositions can comprise a surfactant package comprising a primary foaming surfactant and optionally one or more secondary surfactants; and water (e.g., a brine). The primary foaming surfactant can be present in an amount of from 0.1% to 2.5% by weight, such as from 0.25% to 1.5% or from 0.5% to 1%, based on the total weight of the foam precursor composition. The water can be present in an amount of 50% or more by weight (e.g., from 60% by weight to 95% by weight), based on the total weight of the foam precursor composition.

The primary foaming surfactant can comprise an anionic surfactant (e.g., a sulfonate surfactant, a disulfonate surfactant); a cationic surfactant; a non-ionic surfactant (e.g., alkoxylated C6-C32 alcohol); or any combination thereof. In some embodiments, the surfactant package further comprises one or more secondary surfactants (e.g., a non-ionic surfactant, such as an alkoxylated C6-C32 alcohol).

Optionally, the foam precursor composition can further comprise a viscosity-modifying polymer (e.g., a synthetic polymer and/or a biopolymer such as a polysaccharide), a foam stabilizer (e.g., a crosslinker, a particulate stabilizer, or any combination thereof), a co-solvent (e.g., a C1-C5 alcohol, an alkoxylated C1-C5 alcohol, a glycol ether, a polyalkylene glycol, or any combination thereof), or any combination thereof. In some embodiments, the composition is substantially free of proppant.

In some embodiments, the foam precursor composition can exhibit an interfacial tension (IFT) of less than 0.5 dynes/cm, such as an IFT of from 0.01 dynes/cm to 0.5 dynes/cm, an IFT of from 0.05 dynes/cm to 0.3 dynes/cm, an IFT of from 0.08 dynes/cm to 0.3 dynes/cm, or an IFT of from 0.1 dynes/cm to 0.2 dynes/cm between the foam precursor composition and the hydrocarbons present in the unconventional subterranean formation.

In some embodiments when foamed with an expansion gas to produce a foamed composition having a foam quality of at least 0.8 (e.g., a foam quality of from 0.85 to 0.98), the foamed composition can exhibit an apparent viscosity of at least 1.5 cP at 25° C., such as an apparent viscosity of from 2 cP to 5 cP at 25° C.

The aqueous foam precursor compositions can be foamed with an expansion gas to provide foamed compositions for use in the stimulation methods described herein. Accordingly, also provided are foamed compositions that include an aqueous foam precursor composition described herein and from 30% to 98% (e.g., from 50% to 98%, from 65% to 98%, from 80% to 98%, from 85% to 98%, or from 90% to 98%) expansion gas. The expansion gas can comprise air, helium, carbon dioxide, nitrogen, natural gas or a hydrocarbon component thereof, or any combination thereof.

Also provided are methods for screening foam precursor compositions for use in stimulating an unconventional subterranean formation comprising hydrocarbons. These methods can comprise (a) selecting a surfactant package comprising a primary foaming surfactant and optionally one or more secondary surfactants; (b) preparing a foam composition comprising: the surfactant package, wherein the primary foaming surfactant is present in an amount of from 0.1% to 2.5% by weight (e.g., from 0.25% to 1.5% or from 0.5% to 1% by weight), based on the total weight of the foam precursor composition; and water, wherein the water is present in an amount of 50% or more by weight, based on the total weight of the foam precursor composition; and (c) determining an interfacial tension (IFT) between the foam precursor composition and the hydrocarbons present in the unconventional subterranean formation.

An IFT of less than 0.5 dynes/cm, such as an IFT of from 0.01 dynes/cm to 0.5 dynes/cm, an IFT of from 0.05 dynes/cm to 0.3 dynes/cm, an IFT of from 0.08 dynes/cm to 0.3 dynes/cm, or an IFT of from 0.1 dynes/cm to 0.2 dynes/cm, can indicate that the foam precursor composition is suitable for use in stimulating the unconventional subterranean. In such embodiments, the method can further comprise utilizing the aqueous foam precursor composition in a foam stimulation operation described herein. Such methods can comprise (d) combining the foam precursor solution with an expansion gas to form a foamed composition above ground, and injecting the foamed composition through an existing wellbore into the unconventional subterranean formation; or combining the foam precursor solution with an expansion gas downhole to form a foamed composition in situ within an existing wellbore; (e) allowing the foamed composition to contact a rock matrix of the unconventional subterranean formation for a period of time; and (f) producing fluids from the unconventional subterranean formation through the wellbore.

An IFT of greater than 0.5 dynes/cm can indicate that the foam precursor composition is not suitable for use in stimulating the unconventional subterranean (e.g., that the composition can or should be further optimized prior to use in a foam stimulation operation). In such embodiments, the method can further comprise preparing an alternative foam precursor composition differing in some respect from the first foam precursor composition tested, and evaluating the IFT of the alternative foam precursor composition to determine if the alternative foam precursor composition is suitable for use. This process can be performed iteratively to arrive at a foam precursor composition having an IFT which suggests that the composition will produce a foam particularly suitable for use in a foam stimulation operation. Such methods can comprise (d) repeating steps (a)-(c) to arrive at a second foam precursor composition comprising a second surfactant package having a different composition than the surfactant package present in the first foam precursor composition, wherein the IFT of the second foam precursor composition is less than 0.5 dynes/cm, such as an IFT of from 0.05 dynes/cm to 0.5 dynes/cm, (e) combining the second foam precursor solution with an expansion gas to form a foamed composition above ground, and injecting the foamed composition through an existing wellbore into the unconventional subterranean formation; or combining the second foam precursor solution with an expansion gas downhole to form a foamed composition in situ within an existing wellbore; (f) allowing the foamed composition to contact a rock matrix of the unconventional subterranean formation for a period of time; and (g) producing fluids from the unconventional subterranean formation through the wellbore.

BRIEF DESCRIPTION OF THE FIGURES

The accompanying figures, which are incorporated in and constitute a part of this specification, illustrate several aspects of the disclosure and, together with the description, serve to explain the principles of the disclosure.

DETAILED DESCRIPTION

Figure 1:
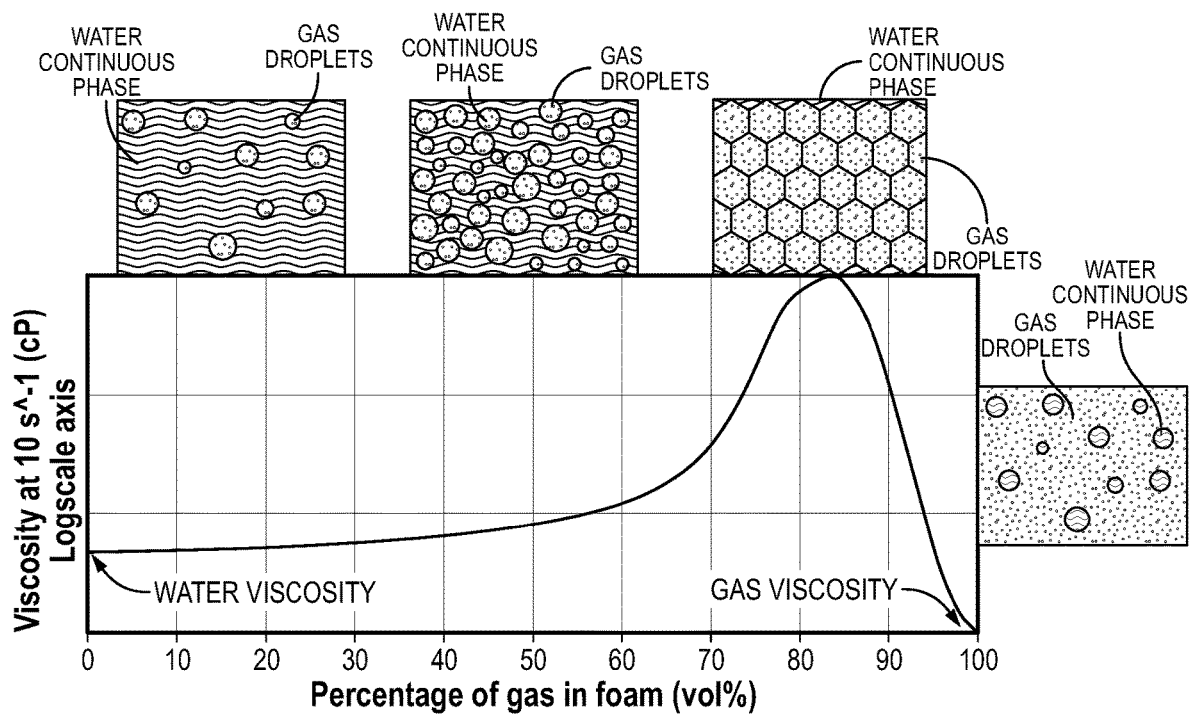
FIG. 1. Illustration of viscosity of foam vs. quality of foam.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

"Hydrocarbon-bearing formation" or simply "formation" refers to the rock matrix in which a wellbore may be drilled. For example, a formation refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of liquid hydrocarbons and gas hydrocarbons (e.g. including gas condensate), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term "reservoir" or "subsurface reservoir" or "subsurface region of interest" or "subsurface formation" or "subsurface volume of interest". For example, in some embodiments, the reservoir may be, but is not limited to, a shale reservoir, a carbonate reservoir, a tight sandstone reservoir, a tight siltstone reservoir, a gas hydrate reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or a combination of trajectories. For example, the wellbore may be a vertical wellbore, a horizontal wellbore, a multilateral wellbore, or slanted wellbore. The deviation of the wellbore may change, for example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. The term wellbore is not limited to any description or configuration described herein. The term wellbore may be used synonymously with the terms borehole or well.

"Friction reducer," as used herein, refers to a chemical additive that alters fluid rheological properties to reduce friction created within the fluid as it flows through small-diameter tubulars or similar restrictions (e.g., valves, pumps). Generally polymers, or similar friction reducing agents, add viscosity to the fluid, which reduces the turbulence induced as the fluid flows. Reductions in fluid friction of greater than 50% are possible depending on the friction reducer utilized, which allows the injection fluid to be injected into a wellbore at a much higher injection rate (e.g., between 60 to 100 barrels per minute) and also lower pumping pressure during proppant injection.

"Injection fluid," as used herein, refers to any fluid which is injected into a reservoir via a well. "Fracturing fluid," as used herein, refers to an injection fluid that is injected into the well under pressure in order to cause fracturing within a portion of the reservoir.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

Unless defined otherwise, all technical and scientific terms used herein have the same meanings as commonly understood by one of skill in the art to which the disclosed invention belongs. Unless otherwise specified, all percentages are in weight percent and the pressure is in atmospheres Methods Provided are methods for the stimulation of unconventional reservoirs using the foamed compositions.

Methods for stimulating an unconventional subterranean formation that comprise (a) providing an existing wellbore in fluid communication with an unconventional subterranean formation, wherein the existing wellbore has a pressure that is less than original reservoir pressure; (b) injecting a foamed composition through the existing wellbore into the unconventional subterranean formation, (c) allowing foamed composition to contact a rock matrix of the unconventional subterranean formation for a period of time (referred to herein as "soak time"); and (d) producing fluids from the unconventional subterranean formation through the wellbore. In some cases, the methods do not include step (a). Some embodiments include producing fluids from the unconventional subterranean formation through at least one other wellbore in fluid communication with the unconventional subterranean formation.

In some cases, methods for stimulating an unconventional subterranean formation can further comprise repeating steps (b)-(d) (e.g., from 2 to 10 times in sequence). In some cases, methods for stimulating an unconventional subterranean formation can further comprise repeating steps (b)-(d) 2 times or more in sequence (e.g., 3 times or more, 4 times or more, 5 times or more, 6 times or more, 7 times or more, 8 times or more or 9 times or more). In some cases, methods for stimulating an unconventional subterranean formation can further comprise repeating steps (b)-(d) 10 times or less in sequence (e.g., 9 times or less, 8 times or less, 7 times or less, 6 times or less, 5 times or less, 4 times or less, or 3 times or less). The amount of times steps (b)-(d) are repeated in sequence can range from any of the minimum values described above to any of the maximum values described above. For example, the methods for stimulating an unconventional subterranean formation can further comprise repeating steps (b)-(d) from 2 times to 10 times in sequence (e.g., from 2 times to 6 times, from 6 times to 10 times, from 2 times to 4 times, from 4 times to 6 times, from 6 times to 8 times, from 8 times to 10 times, from 2 times to 9 times, from 3 times to 10 times, or from 3 times to 9 times).

In some examples, in step (b), the foamed composition can be injected at a pressure and flowrate effective to increase the existing wellbore pressure without refracturing the existing wellbore.

In some examples, the existing wellbore can have a pressure that at least 20% of the original reservoir pressure (e.g., at least 25%, at least 30%, at least 35%, at least 40%, at least 45%, at least 50%, at least 55%, at least 60%, or at least 65%). In some examples, the existing wellbore can have a pressure that is 70% or less of the original reservoir pressure (e.g., 65% or less, 60% or less, 55% or less, 50% or less, 45% or less, 40% or less, 35% or less, 30% or less, or 25% or less). The pressure of the existing wellbore relative to the original reservoir pressure can range from any of the minimum values described above to any of the maximum values described above. For example, the existing wellbore can have a pressure that is from 20% to 70% of the original reservoir pressure (e.g., from 20% to 45%, from 45% to 70%, from 20% to 30%, from 30% to 40%, from 40% to 50%, from 50% to 60%, from 60% to 70%, from 30% to 70%, from 20% to 60%, or from 30% to 60%).

In some examples, step (b) can comprise injecting the foamed composition at a pressure and flowrate effective to increase the existing wellbore pressure by at least 30% (e.g., at least 40%, at least 50%, at least 60%, at least 70%, at least 80%, at least 90%, at least 100%, at least 110%, at least 120%, at least 130%, at least 140%, at least 150%, at least 160%, at least 170%, at least 180%, at least 190%, or at least 200%). In some examples, step (b) can comprise injecting the foamed composition at a pressure and flowrate effective to increase the existing wellbore pressure to from greater than the original reservoir pressure to 150% of the original reservoir pressure. In some examples, step (b) can comprise injecting the foamed composition at a pressure and flowrate effective to increase the existing wellbore pressure to within 15% (e.g., ±15%, ±14%, ±13%, ±12%, ±11%, ±10%, ±9%, ±8%, ±7%, ±6%, ±5%, ±4%, ±3%, ±2%, or ±1%) of original reservoir fracture pressure (so as to not substantially refracture the existing wellbore). In some examples, step (b) can comprise injecting the foamed composition at a pressure and flowrate effective to increase the existing wellbore pressure so as to refracture the existing wellbore.

By way of example, in some embodiments, the original reservoir pressure can be approximately 6000-7000 psia, and an original reservoir fracture pressure of from approximately 8000-9000 psia. After 1 year of production, the existing wellbore can have a wellbore pressure substantially below original reservoir pressure. For example, after 1 year of production, the existing wellbore pressure can drop to approximately 3000-4000 psia. After more than a year, the existing wellbore pressure can drop even further (e.g., to approximately 2000-3000 psia). During a stimulation operation described herein, the foamed composition can be injected at a pressure and flowrate effective to increase the existing wellbore pressure during injection to approximately 6000-9000 psia.

In some embodiment, a single foamed composition can be injected into the existing wellbore. In other embodiments, introduction of the foamed composition into the existing wellbore can comprise sequential injection of a series (e.g., two, three, four, or five) foamed compositions of varying composition into the existing wellbore.

In these stimulation methods, the same wellbore can be used for both introducing the foamed composition and producing fluids from the unconventional subterranean formation. In some embodiments, introduction of the foamed can increase the production of hydrocarbons from the same wellbore, from a different wellbore in fluid communication with the unconventional subterranean formation, or any combination thereof. For example, injection of the foamed composition into the existing wellbore can result in increased hydrocarbon recovery from the existing wellbore as compared to an expected level of hydrocarbon recovery projected from a decline curve fit to production history of the existing wellbore. The decline curve can be fit to production history of the existing wellbore using, for example, Arp's Equation.

Methods for determining decline curves for production wells are well known in the art. See, for example, "Estimating Ultimate Recovery of Developed Wells in Low-Permeability Reservoirs," Monograph 4, Society of Petroleum Engineers (ISBN 9781938330018) and "Guidelines for the Practical Evaluation of Undeveloped Reserves in Resource Plays," Monograph 3, Society of Petroleum Engineers (2010), each of which is hereby incorporated by reference in its entirety.

In some embodiments, injection of the foamed composition in the existing wellbore can increase the relative permeability in a region proximate to the existing wellbore.

In some embodiments, injection of the foamed composition in the existing wellbore releases hydrocarbons from pores in the rock matrix in the region proximate to the existing wellbore.

Figure 9:
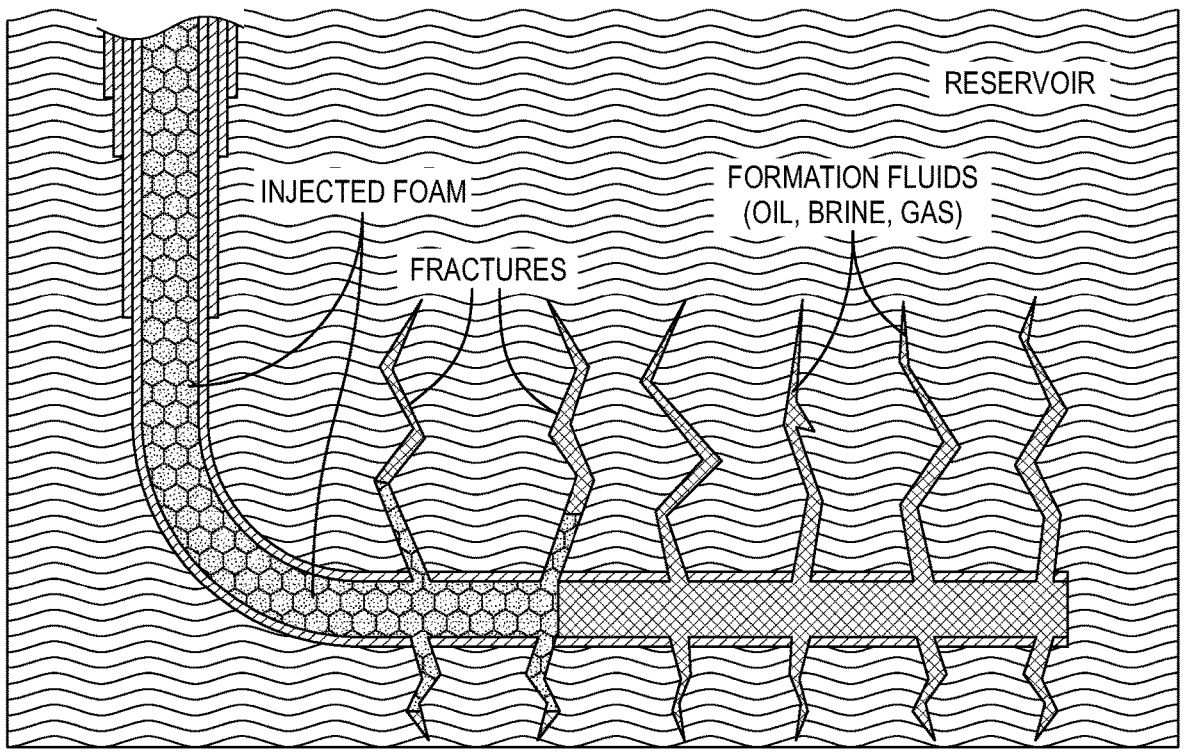
FIG. 9. Illustration of a scenario where the foam is generated at the surface and then injected into the well.
Figure 10:
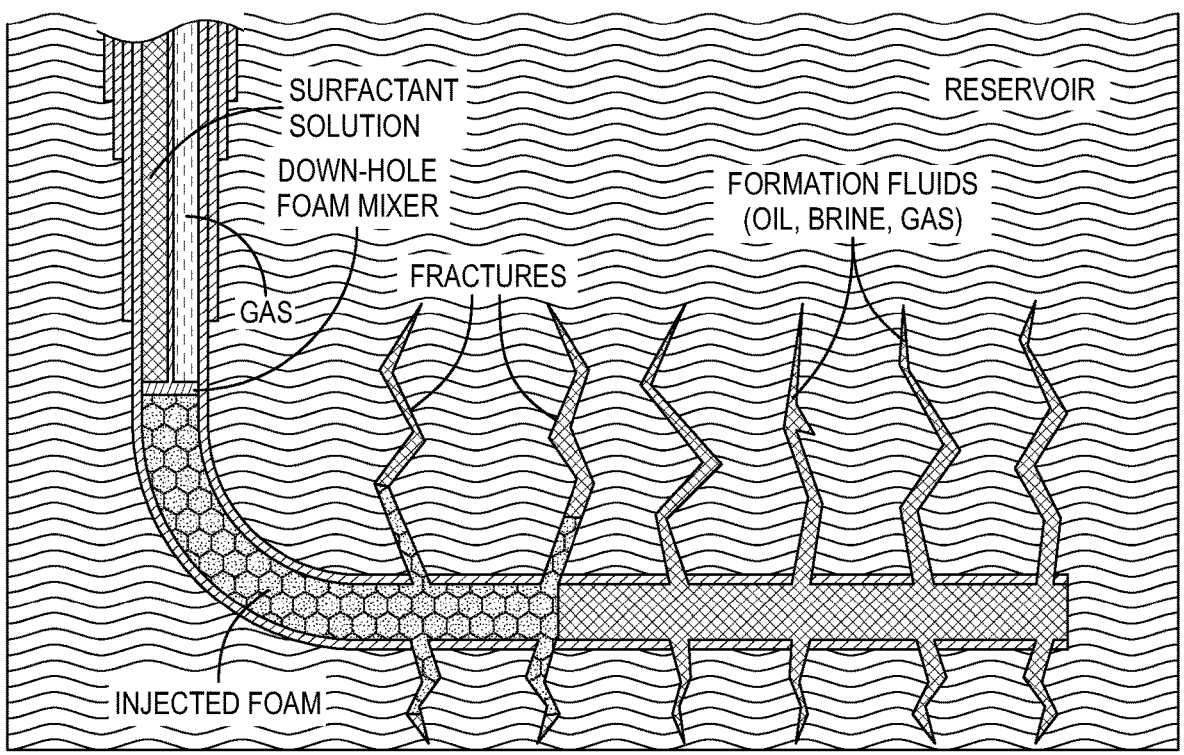
FIG. 10. Illustration of a scenario where the foam is generated down-hole by injecting a surfactant solution and a gas down-hole and a down-hole foam mixer subsequently mixes the surfactant solution and gas down-hole to generate the foam.
Figure 11:
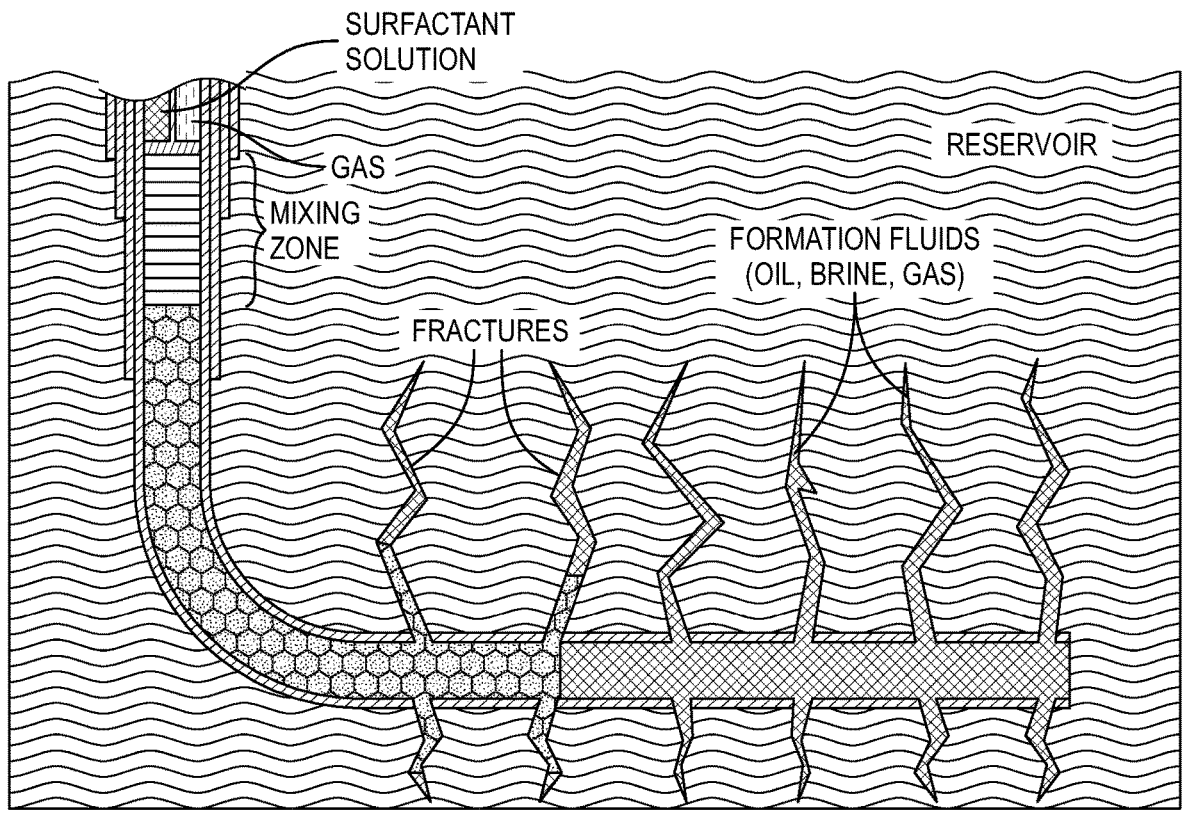
FIG. 11. Illustration of a scenario where the surfactant and gas are co-injected into the well such that they mix together in a mixing zone to generate the foam down-hole.
Figure 12:
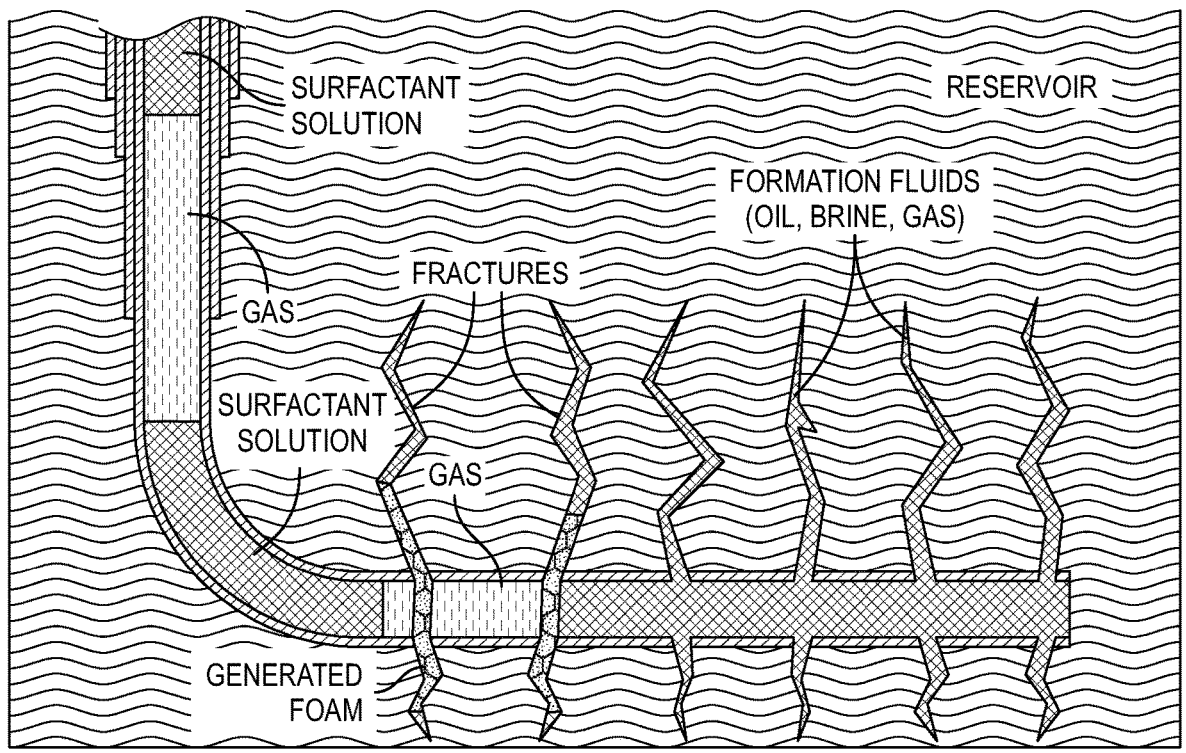
FIG. 12. Illustration of a scenario where the gas and surfactant solution are alternately injected into the well such that the foam is generated down-hole.

In some embodiments, the stimulation operation can further comprise preparing the foamed composition. For example, in some embodiments, the stimulation operation (e.g., step (b)) can further comprise combining a foam precursor solution with an expansion gas to form the foamed composition above ground, and injecting the foamed composition through the existing wellbore into the unconventional subterranean formation (FIG. 9). In some embodiments, the stimulation operation (e.g., step (b)) can further comprise combining a foam precursor solution with an expansion gas downhole to form the foamed composition in situ within the existing wellbore. FIG. 10 illustrates a scenario where the foam is generated down-hole by injecting a surfactant solution and a gas down-hole and a down-hole foam mixer subsequently mixes the surfactant solution and gas down-hole to generate the foam. FIG. 11 illustrates a scenario where the surfactant and gas are co-injected into the well such that they mix together in a mixing zone to generate the foam down-hole. FIG. 12 illustrates a scenario where the gas and surfactant solution are alternately injected into the well such that the foam is generated down-hole.

The foamed composition can be allowed to contact the rock matrix (e.g., imbibe into the rock matrix) of the unconventional subterranean formation for varying periods of time depending on the nature of the rock matrix. The contacting (imbibing) can occur during the introducing step, between the introducing and producing step, or any combination thereof. In some examples, the foamed composition can be allowed to contact the rock matrix of the unconventional subterranean formation for at least one day (e.g., at least two days, at least three days, at least four days, at least five days, at least six days, at least one week, at least two weeks, at least three weeks, at least one month, at least two months, at least three months, at least four months, or at least five months). In some examples, the foamed composition can be allowed to contact the rock matrix of the unconventional subterranean formation for six months or less (e.g., five months or less, four months or less, three months or less, two months or less, one month or less, three weeks or less, two weeks or less, one week or less, six days or less, five days or less, four days or less, three days or less, or two days or less).

Injection of a gas into a reservoir for stimulation is more effective when the gas can be pressurized up to miscibility between gas and oil. This is hard to do when the reservoir is not vertically contained and/or when there are fractures that can carry the gas away from the target area, preventing pressure buildup. Foamed compositions can help with this targeted injection and pressure buildup due to its higher viscosity.

FIG. 1 is an illustration of the viscosity of a foam as a function of the quality of the foam. At low quality, there is a low percentage of gas in the foam, and the foam comprises gas droplets dispersed within a water continuous phase such that the viscosity is similar to water. As the quality of the foam increases, the viscosity increases with a sharp increase in viscosity around 60% quality. Further increasing the quality above about 85% results in a decline in viscosity, as the composition comprises a gas continuous phase with water droplets dispersed therein. The maximum viscosity observed depends strongly on the type and concentration of the surfactant, temperature, pressure, gas, salinity of water, among others.

For example, the foamed composition can have a high viscosity which can result in resistance to flow in some highly conductive fractures in the rock matrix and thus can more evenly distribute the foamed composition to other fractures and make them more productive through stimulation. This can result in a significantly higher area of contact between the injected foamed composition and the rock matrix compared to injecting an aqueous solution or gas, which may just finger through the reservoir through thief zones or highly conductive fractures.

Figure 2:
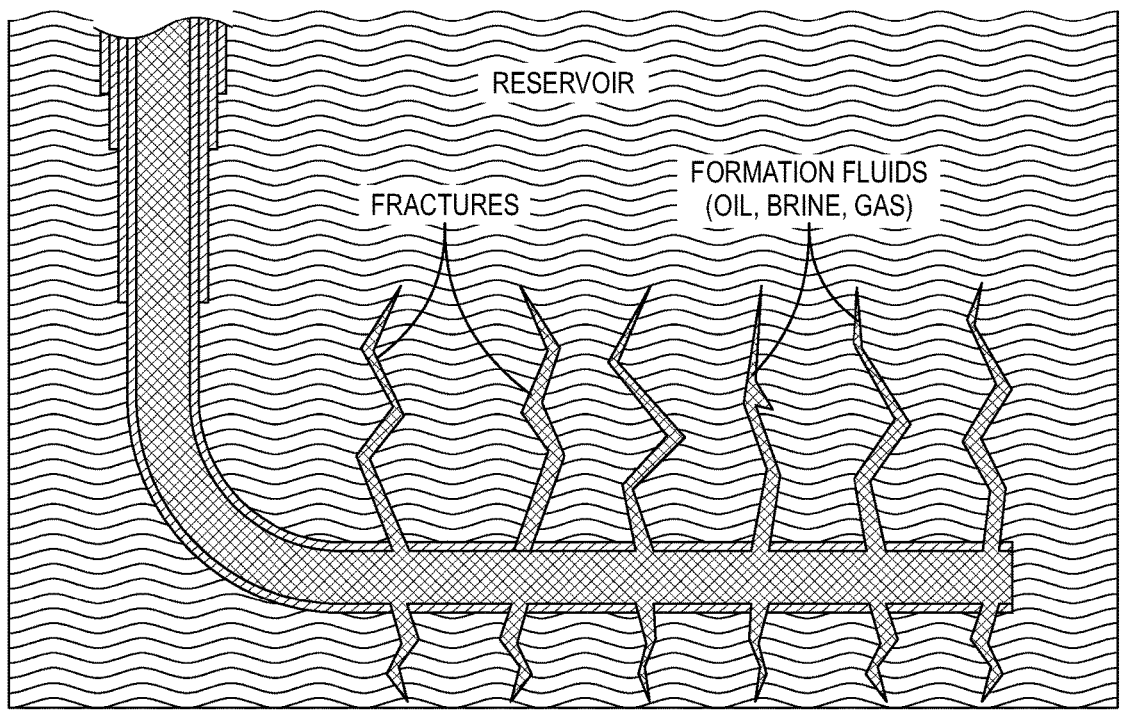
FIG. 2. Illustration of hydraulically fractured horizontal well.

FIG. 2 is an illustration of a hydraulically fractured horizontal well.

Figure 3:
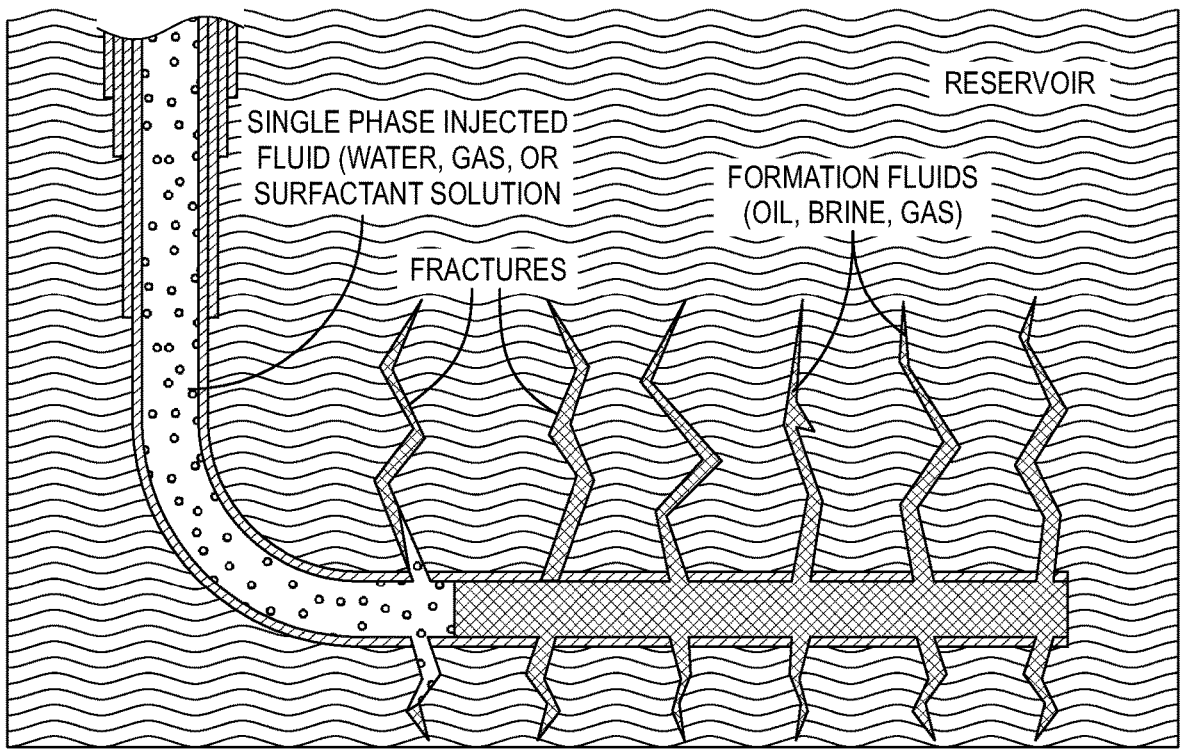
FIG. 3. Illustration of single phase fluid injection (e.g., water, gas, or surfactant solution) at the beginning of injection.
Figure 4:
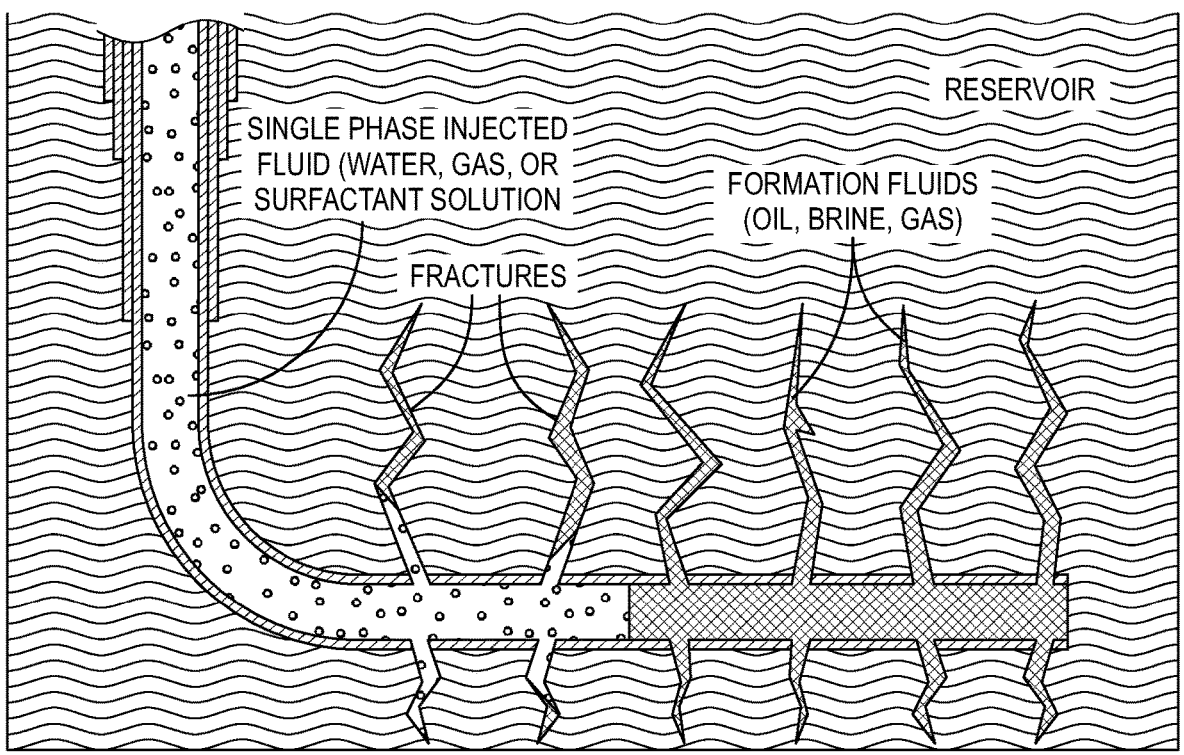
FIG. 4. Illustration of single phase fluid injection (e.g., water, gas, or surfactant solution) at the middle of injection.
Figure 5:
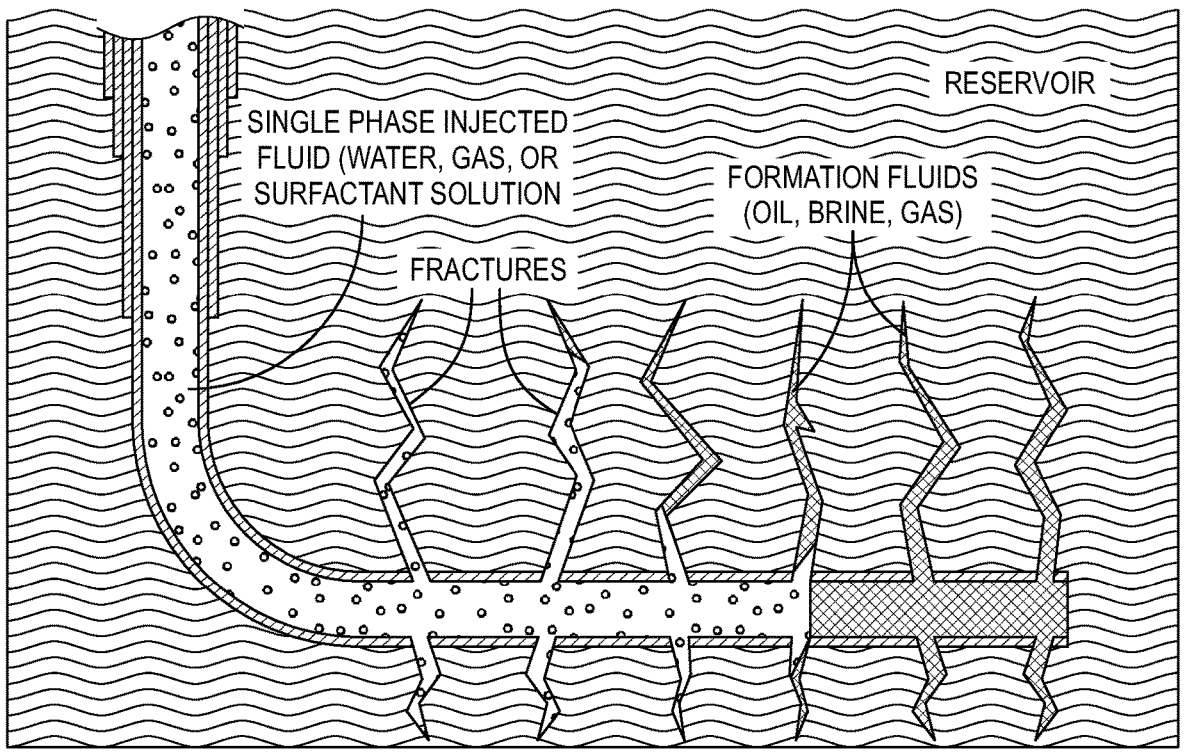
FIG. 5. Illustration of single phase fluid injection (e.g., water, gas, or surfactant solution) at the end of injection.
Figure 6:
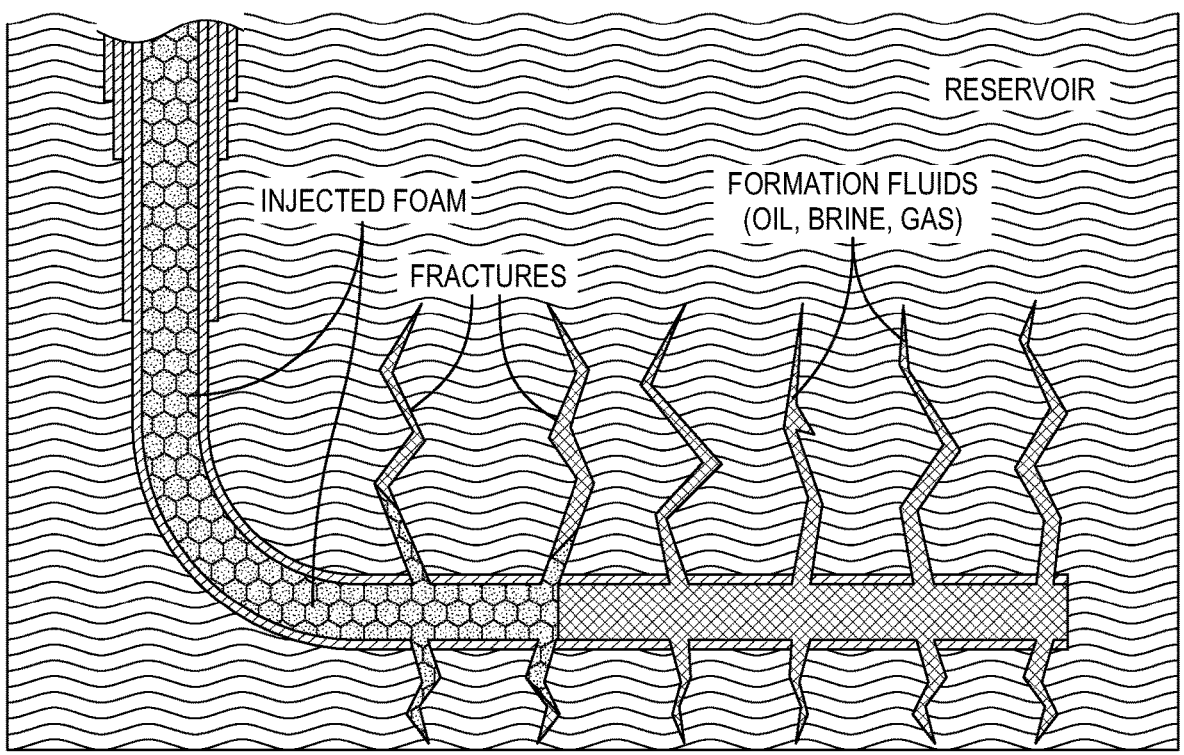
FIG. 6. Illustration of foam injection at the beginning of injection.
Figure 7:
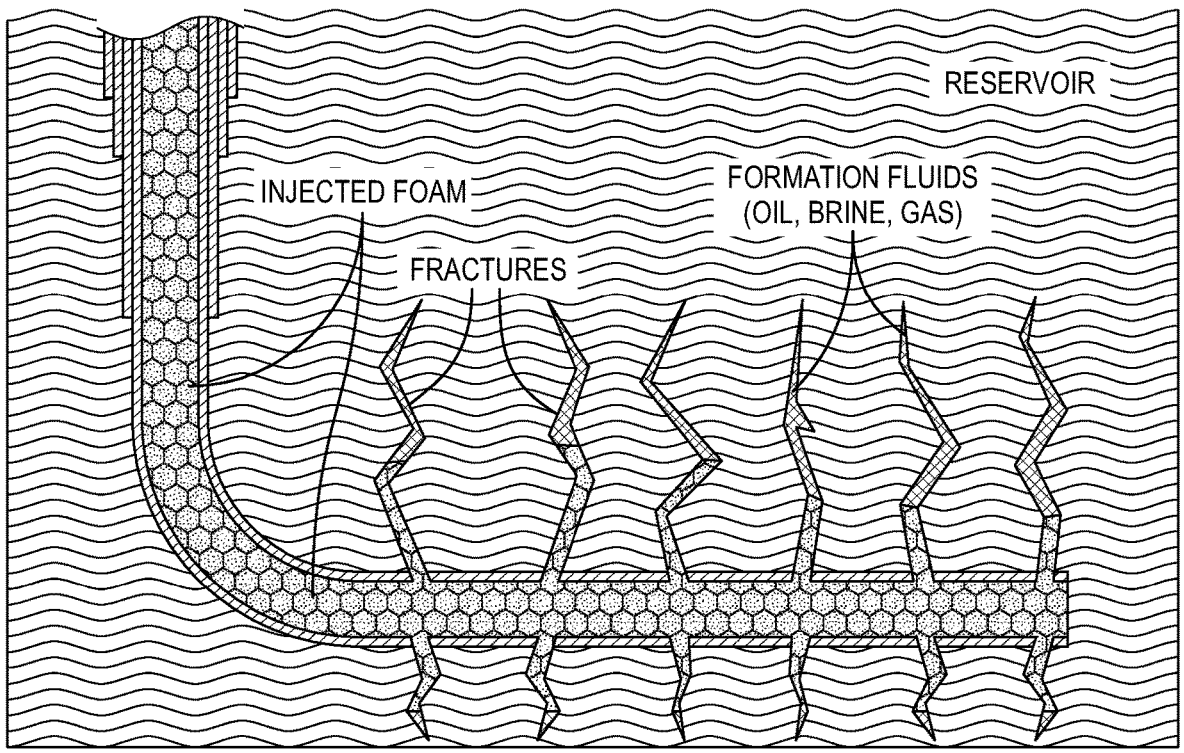
FIG. 7. Illustration of foam injection at the middle of injection.
Figure 8:
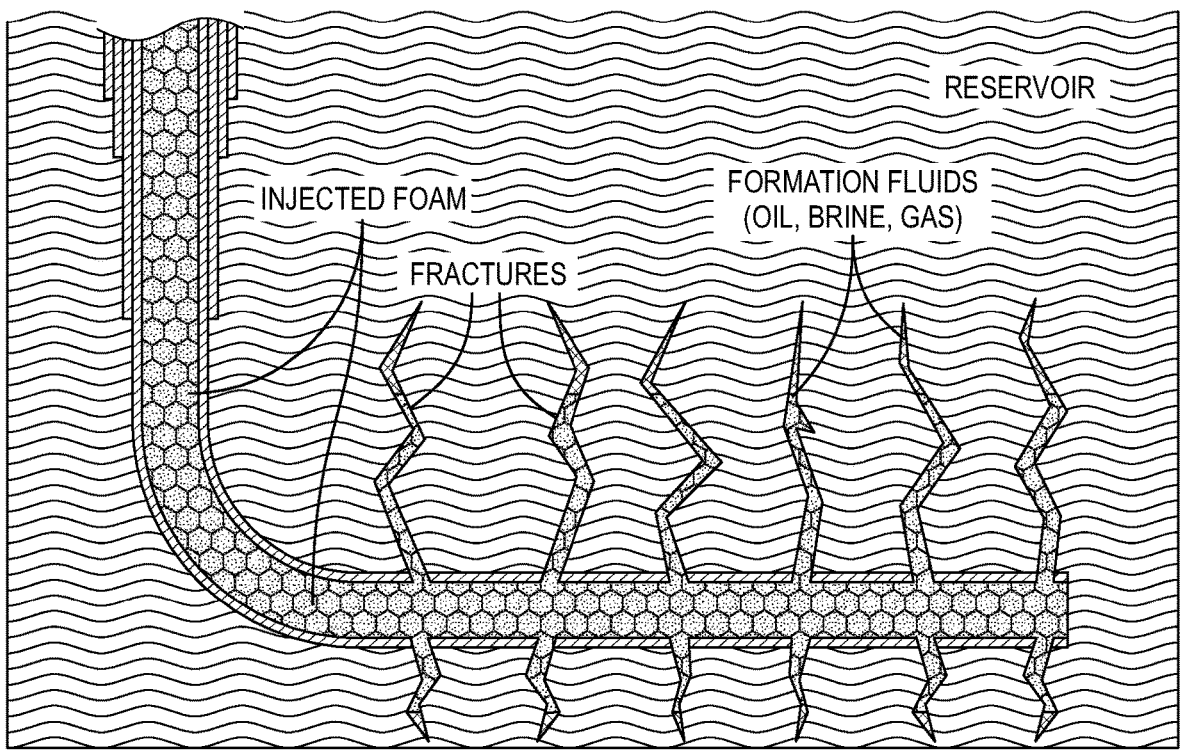
FIG. 8. Illustration of foam injection at the end of injection.

FIG. 3-FIG. 5 illustrate single phase fluid injection (water, gas, or surfactant) into a hydraulically fractured horizontal well. Before injection, the hydraulically fractured horizontal well is illustrated in FIG. 2. FIG. 3, FIG. 4, and FIG. 5 illustrate the beginning, middle, and end of the single phase fluid injection into the hydraulically fractured horizontal well. Injection of a single phase fluid into the hydraulically fractured horizontal well results in uneven stimulation of fractures with most of the fluid going into fractures near the heel of the well (FIG. 3-FIG. 5). FIG. 6-FIG. 8 illustrate foam injection into a hydraulically fractured horizontal well. Before injection, the hydraulically fractured horizontal well is illustrated in FIG. 2. FIG. 6, FIG. 7, and FIG. 8 illustrate the beginning, middle, and end of the foam injection into the hydraulically fractured horizontal well. The foam can provide increased resistance to flow due to its higher viscosity compared to water or gas when in fractures. Accordingly, foam injection can provide improved distribution of the foam into the fractures, leading to increased contact between reservoir/matrix and the gas and surfactant.

The foamed compositions are a delivery mechanism of gas and aqueous solution; further, once the foamed composition breaks, the gas and aqueous solutions can perform what they were designed to do more effectively over a larger area of the reservoir. As such, in some embodiments, the foamed composition can be allowed to contact the rock matrix of the unconventional subterranean formation for a period of time effective to allow the composition to break, releasing gas and an aqueous solution throughout the reservoir/matrix. In other embodiments, a breaker can be introduced to facilitate release of the gas and the aqueous solution throughout the reservoir/matrix.

In some embodiments, the wellbore used in the stimulation operation may have a substantially vertical portion only, or a substantially vertical portion and a substantially horizontal portion below the substantially vertical portion.

In some embodiments, the stimulation methods described herein can comprise stimulating a naturally fractured region of the unconventional subterranean formation proximate to a wellbore (e.g., an infill well). In some embodiments, the stimulation methods described herein can comprise stimulating a naturally fractured region of the unconventional subterranean formation proximate to an existing wellbore.

In some embodiments, the stimulation methods described herein can comprise stimulating a previously fractured or previously refractured region of the unconventional subterranean formation proximate to a wellbore (e.g., an infill well). In some embodiments, the stimulation methods described herein can comprise stimulating a previously fractured or previously refractured region of the unconventional subterranean formation proximate to an existing wellbore.

The previous fracturing operation may include hydraulic fracturing, fracturing using electrodes such as described in U.S. Pat. Nos. 9,890,627, 9,840,898, U.S. Patent Publication No. 2018/0202273, or fracturing with any other available equipment or methodology. The previous refracturing operation may include hydraulic fracturing, fracturing using electrodes such as described in U.S. Pat. Nos. 9,890,627, 9,840, 898, U.S. Patent Publication No. 2018/0202273, or refracturing with any other available equipment or methodology.

For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

In some embodiments, after a formation that has fractures, such as naturally occurring factures, fractures from a fracture operation, fractures from a refracturing operation, or any combination thereof, the fractured formation may be stimulated. For example, a formation may be stimulated after a sufficient amount of time has passed since the fracturing operation (e.g., hydraulic fracturing operation, fracturing operation with electrodes, or refracturing operation with electrodes) occurred in that formation so that the electrical pulses utilized to fracture or refracture that formation do not substantially affect the foamed composition.

In some embodiments, the stimulation operation can further comprise adding a tracer to the foamed composition prior to introducing the foamed composition through the wellbore into the unconventional subterranean formation, recovering the tracer from the fluids produced from the unconventional subterranean formation through the wellbore, fluids recovered from a different wellbore in fluid communication with the unconventional subterranean formation, or any combination thereof; and comparing the quantity of tracer recovered from the fluids produced to the quantity of tracer introduced to the foamed composition. The tracer can be any suitable tracer, such as a water tracer or an oil tracer.

The foamed compositions (e.g., the surfactant package) can be optimized for each unconventional reservoir. For example, a foamed composition can be tested at a specific reservoir temperature and salinity. Actual native reservoir fluids may also be used to test the compositions.

In some embodiments, the unconventional subterranean formation can have a temperature of at least 75° F. (e.g., at least 80° F., at least 85° F., at least 90° F., at least 95° F., at least 100° F., at least 105° F., at least 110° F., at least 115° F., at least 120° F., at least 125° F., at least 130° F., at least 135° F., at least 140° F., at least 145° F., at least 150° F., at least 155° F., at least 160° F., at least 165° F., at least 170° F., at least 175° F., at least 180° F., at least 190° F., at least 200° F., at least 205° F., at least 210° F., at least 215° F., at least 220° F., at least 225° F., at least 230° F., at least 235° F., at least 240° F., at least 245° F., at least 250° F., at least 255° F., at least 260° F., at least 265° F., at least 270° F., at least 275° F., at least 280° F., at least 285° F., at least 290° F., at least 295° F., at least 300° F., at least 305° F., at least 310° F., at least 315° F., at least 320° F., at least 325° F., at least 330° F., at least 335° F., at least 340° F., or at least 345° F.). In some embodiments, the unconventional subterranean formation can have a temperature of 350° F. or less (e.g., 345° F. or less, 340° F. or less, 335° F. or less, 330° F. or less, 325° F. or less, 320° F. or less, 315° F. or less, 310° F. or less, 305° F. or less, 300° F. or less, 295° F. or less, 290° F. or less, 285° F. or less, 280° F. or less, 275° F. or less, 270° F. or less, 265° F. or less, 260° F. or less, 255° F. or less, 250° F. or less, 245° F. or less, 240° F. or less, 235° F. or less, 230° F. or less, 225° F. or less, 220° F. or less, 215° F. or less, 210° F. or less, 205° F. or less, 200° F. or less, 195° F. or less, 190° F. or less, 185° F. or less, 180° F. or less, 175° F. or less, 170° F. or less, 165° F. or less, 160° F. or less, 155° F. or less, 150° F. or less, 145° F. or less, 140° F. or less, 135° F. or less, 130° F. or less, 125° F. or less, 120° F. or less, 115° F. or less, 110° F. or less, 105° F. or less, 100° F. or less, 95° F. or less, 90° F. or less, 85° F. or less, or 80° F. or less).

The unconventional subterranean formation can have a temperature ranging from any of the minimum values described above to any of the maximum values described above. For example, in some embodiments, the unconventional subterranean formation can have a temperature of from 75° F. to 350° F. (approximately 24° C. to 176° C.), from 150° F. to 250° F. (approximately 66° C. to 121° C.), from 110° F. to 350° F. (approximately 43° C. to 176° C.), from 110° F. to 150° F. (approximately 43° C. to 66° C.), from 150° F. to 200° F. (approximately 66° C. to 93° C.), from 200° F. to 250° F. (approximately 93° C. to 121° C.), from 250° F. to 300° F. (approximately 121° C. to 149° C.), from 300° F. to 350° F. (approximately 149° C. to 176° C.), from 110° F. to 240° F. (approximately 43° C. to 116° C.), or from 240° F. to 350° F. (approximately 116° C. to 176° C.).

In some embodiments, the salinity of unconventional subterranean formation can be at least 5,000 ppm TDS (e.g., at least 25,000 ppm TDS, at least 50,000 ppm TDS, at least 75,000 ppm TDS, at least 100,000 ppm TDS, at least 125,000 ppm TDS, at least 150,000 ppm TDS, at least 175,000 ppm TDS, at least 200,000 ppm TDS, at least 225,000 ppm TDS, at least 250,000 ppm TDS, or at least 275,000 ppm TDS). In some embodiments, the salinity of unconventional subterranean formation can be 300,000 ppm TDS or less (e.g., 275,000 ppm TDS or less, 250,000 ppm TDS or less, 225,000 ppm TDS or less, 200,000 ppm TDS or less, 175,000 ppm TDS or less, 150,000 ppm TDS or less, 125,000 ppm TDS or less, 100,000 ppm TDS or less, 75,000 ppm TDS or less, 50,000 ppm TDS or less, or 25,000 ppm TDS or less).

The salinity of unconventional subterranean formation can range from any of the minimum values described above to any of the maximum values described above. For example, in some embodiments, the salinity of unconventional subterranean formation can be from 5,000 ppm TDS to 300,000 ppm TDS (e.g., from 100,000 ppm to 300,000 ppm TDS).

In some embodiments, the unconventional subterranean formation can be oil-wet. In some embodiments, the unconventional subterranean formation can be water-wet. In some embodiments, the unconventional subterranean formation can be mixed-wet.

In some embodiments, the foamed composition can be introduced at a wellhead pressure of at least 0 PSI (e.g., at least 1,000 PSI, at least 2,000 PSI, at least 3,000 PSI, at least 4,000 PSI, at least 5,000 PSI, at least 6,000 PSI, at least 7,000 PSI, at least 8,000 PSI, at least 9,000 PSI, at least 10,000 PSI, at least 15,000 PSI, at least 20,000 PSI, or at least 25,000 PSI). In some embodiments, the foamed composition can be introduced at a wellhead pressure of 30,000 PSI or less (e.g., 25,000 PSI or less, 20,000 PSI or less, 15,000 PSI or less, 10,000 PSI or less, 9,000 PSI or less, 8,000 PSI or less, 7,000 PSI or less, 6,000 PSI or less, 5,000 PSI or less, 4,000 PSI or less, 3,000 PSI or less, 2,000 PSI or less, or 1,000 PSI or less).

The foamed composition can be introduced at a wellhead pressure ranging from any of the minimum values described above to any of the maximum values described above. For example, in some embodiments, the foamed composition can be introduced at a wellhead pressure of from 0 PSI to 30,000 PSI (e.g., from 6,000 PSI to 30,000 PSI, or from 5,000 PSI to 10,000 PSI. In some embodiments, the foamed composition can be used in a reservoir stimulation operation, and the foamed composition can be introduced at a wellhead pressure of from 0 PSI to 1,000 PSI.

Foamed Compositions and Foam Precursor Compositions

The foamed compositions described herein can include one or more components which can stimulate hydrocarbon recovery from the existing wellbore. Examples of such components include a surfactant package, an acid, an alkali agent, a co-solvent, a viscosity-modifying polymer, or any combination thereof. In particular, the foam composition can provide a combination of physical energy and chemical energy to remediate near wellbore damage in the formation and stimulate. In some embodiments, the foamed compositions can include a foam precursor solution. The foam precursor solution can include a surfactant package. In some embodiments, the foam precursor composition can include all of the components of the foamed composition (except for the expansion gas). In some embodiments, the foamed compositions can include a foam precursor solution and an expansion gas.

The foamed composition can comprise a surfactant package comprising a primary foaming surfactant and optionally one or more secondary surfactants. The foamed compositions can further include one or more additional additives, such as an acid, an alkali agent, a co-solvent, a viscosity-modifying polymer, a foam stabilizer, a chelating agent (e.g., EDTA or a salt thereof), a clay swelling inhibitor (e.g., KCl), a biocide, a scale inhibitor, a breaker, a corrosion inhibitor, a sulfide scavenger, or any combination thereof.

The foamed composition can comprise any type of water, treated or untreated, and can vary in salt content. For example, the foamed composition can comprise sea water, brackish water, flowback or produced water, wastewater (e.g., reclaimed or recycled), brine (e.g., reservoir or synthetic brine), fresh water (e.g., fresh water comprises <1,000 ppm TDS water), or any combination thereof. In some embodiments, the foamed composition can comprise slickwater. In some embodiments, the foamed composition can comprise brine.

In some embodiments, the foamed composition can comprise 50% or more by weight water, based on the total weight of the foamed composition (e.g., 55% or more, 60% or more, 65% or more, 70% or more, 75% or more, 80% or more, 85% or more, 90% or more, or 95% or more). In some embodiments, the foamed composition can comprise less than 100% by weight water, based on the total weight of the foamed composition (e.g., 95% or less, 90% or less, 85% or less, 80% or less, 75% or less, 70% or less, 65% or less, 60% or less, or 55% or less). The amount of water present can range from any of the minimum values described above to any of the maximum values described above. For example, the foamed composition can comprise from 50% to less than 100% by weight water based on the total weight of the foamed composition (e.g., from 50% to 75%, from 75% to 100%, from 50% to 60%, from 60% to 70%, from 70% to 80%, from 80% to 90%, from 90% to less than 100%, from 50% to 90%, from 60% to less than 100%, from 60% to 90%, from 65% to 85%, or from 70% to 80%).

In some embodiments, the foamed compositions can be substantially free (e.g., can include less than 1% by weight, less than 0.5% by weight, or less than 0.1% by weight) of proppant particles. In some examples, the foamed composition can be substantially free (e.g., can include less than 5% by weight, less than 1% by weight, less than 0.5% by weight, or less than 0.1% by weight) of particles having a particle size of 5 micrometers (microns, μm) or more, 10 μm or more, 15 μm or more, 20 μm or more, 25 μm or more, 30 μm or more, 40 μm or more, 50 μm or more, 60 μm or more, 70 μm or more, 80 μm or more, 90 μm or more, 100 μm or more, 110 μm or more, 120 μm or more, 130 μm or more, 140 μm or more, 150 μm or more, 175 μm or more, 200 μm or more, 225 μm or more, 250 μm or more, 275 μm or more, 300 μm or more, 350 μm or more, 400 μm or more, or 450 μm or more).

In some embodiments, the foamed composition can, for example, exhibit a density of 2 lbs/gal or more (e.g., 2.5 lbs/gal or more, 3 lbs/gal or more, 3.5 lbs/gal or more, 4 lbs/gal or more, 4.5 lbs/gal or more, 5 lbs/gal or more, 5.5 lbs/gal or more, 6 lbs/gal or more, 6.5 lbs/gal or more, or 7 lbs/gal or more). In some examples, the foamed composition can exhibit a density of 8 lbs/gal or less (e.g., 7.5 lbs/gal or less, 7 lbs/gal or less, 6.5 lbs/gal or less, 6 lbs/gal or less, 5.5 lbs/gal or less, 5 lbs/gal or less, 4.5 lbs/gal or less, 4 lbs/gal or less, 3.5 lbs/gal or less, or 3 lbs/gal or less). The density exhibited by the foamed composition can range from any of the minimum values described above to any of the maximum values described above. For example, the foamed composition can exhibit a density of from 2 lbs/gal to 8 lbs/gal (e.g., from 2 lbs/gal to 5 lbs/gal, from 5 lbs/gal to 8 lbs/gal, from 2 lbs/gal to 4 lbs/gal, from 4 lbs/gal to 6 lbs/gal, from 6 lbs/gal to 8 lbs/gal, from 2 lbs/gal to 7 lbs/gal, from 3 lbs/gal to 8 lbs/gal, or from 3 lbs/gal to 7 lbs/gal).

In some embodiments, the foamed composition can comprise 30% or expansion gas (e.g., 35% or more, 40% or more, 45% or more, 50% or more, 55% or more, 60% or more, 65% or more, 70% or more, 75% or more, 80% or more, 85% or more, 90% or more, or 95% or more). In some embodiments, the foamed composition can comprise 98% expansion gas or less (e.g., 95% or less, 90% or less, 85% or less, 80% or less, 75% or less, 70% or less, 65% or less, 60% or less, 55% or less, 50% or less, 45% or less, or 40% or less). The amount of expansion gas in the foamed composition can range from any of the minimum values described above to any of the minimum values described above. In some embodiments, the foamed composition can comprise from 30% to 98% expansion gas (e.g., from 30% to 65%, from 65% to 98%, from 30% to 45%, from 45% to 60%, from 60% to 75%, from 75% to 98%, from 40% to 98%, from 50% to 98%, from 30% to 90%, from 40% to 90%, from 60% to 90%, or from 40% to 50%). The expansion gas can comprise, for example, air, helium, carbon dioxide, nitrogen, natural gas or a hydrocarbon component thereof, or any combination thereof.

In some embodiments, the foam precursor composition can exhibit an interfacial tension (IFT) of less than 0.5 dynes/cm (e.g., less than 0.4 dynes/cm, less than 0.35 dynes/cm, less than 0.3 dynes/cm, less than 0.25 dynes/cm, less than 0.2 dynes/cm, less than 0.15 dynes/cm, less than 0.1 dynes/cm, less than 0.095 dynes/cm, less than 0.09 dynes/cm, less than 0.085 dynes/cm, less than 0.08 dynes/cm, less than 0.075 dynes/cm, less than 0.07 dynes/cm, less than 0.065 dynes/cm, less than 0.06 dynes/cm, or less than 0.055 dynes/cm) between the foam precursor composition and the hydrocarbons present in the unconventional subterranean formation. In some embodiments, the foam precursor composition can exhibit an IFT of at least 0.05 dynes/cm (e.g., at least 0.055 dynes/cm, at least 0.06 dynes/cm, at least 0.065 dynes/cm, at least 0.07 dynes/cm, at least 0.075 dynes/cm, at least 0.08 dynes/cm, at least 0.085 dynes/cm, at least 0.09 dynes/cm, at least 0.095 dynes/cm, at least 0.1 dynes/cm, at least 0.15 dynes/cm, at least 0.2 dynes/cm, at least 0.25 dynes/cm, at least 0.3 dynes/cm, at least 0.35 dynes/cm, at least 0.4 dynes/cm, or at least 0.45 dynes/cm) between the foam precursor composition and the hydrocarbons present in the unconventional subterranean formation.

The foam precursor composition can exhibit an IFT between the foam precursor composition and the hydrocarbons present in the unconventional subterranean formation ranging from any of the minimum values described above to any of the maximum values described above. For example, in some embodiments, the foam precursor composition can exhibit an IFT between the foam precursor composition and the hydrocarbons present in the unconventional subterranean formation of from 0.05 dynes/cm to 0.5 dynes/cm (e.g., an IFT of from 0.01 dynes/cm to 0.5 dynes/cm, an IFT of from 0.05 dynes/cm to 0.3 dynes/cm, an IFT of from 0.08 dynes/cm to 0.3 dynes/cm, or an IFT of from 0.1 dynes/cm to 0.2 dynes/cm).

In some embodiments when foamed with an expansion gas to produce a foamed composition having a foam quality of at least 0.8 (e.g., a foam quality of from 0.85 to 0.98), the foamed composition can exhibit an apparent viscosity of at least 1.5 cP (e.g., at least 1.75 cP, at least 2 cP, at least 2.25 cP, at least 2.5 cP, at least 2.75 cP, at least 3 cP, at least 3.25 cP, at least 3.5 cP, at least 3.75 cP, at least 4 cP, at least 4.25 cP, at least 4.5 cP, or at least 4.75 cP) at 25° C. In some embodiments when foamed with an expansion gas to produce a foamed composition having a foam quality of at least 0.8 (e.g., a foam quality of from 0.85 to 0.98), the foamed composition can exhibit an apparent viscosity of 5 cP or less (e.g., 4.75 cP or less, 4.5 cP or less, 4.25 cP or less, 4 cP or less, 3.75 cP or less, 3.5 cP or less, 3.25 cP or less, 3 cP or less, 2.75 cP or less, 2.5 cP or less, 2.25 cP or less, 2 cP or less, or 1.75 cP or less).

When foamed with an expansion gas to produce a foamed composition having a foam quality of at least 0.8 (e.g., a foam quality of from 0.85 to 0.98), the foamed composition can exhibit an apparent viscosity ranging from any of the minimum values described above to any of the maximum values described above. For example, in some embodiments, when foamed with an expansion gas to produce a foamed composition having a foam quality of at least 0.8 (e.g., a foam quality of from 0.85 to 0.98), the foamed composition can exhibit an apparent viscosity of from 1.5 cP to 5 cP at 25° C., or from 2 cP to 5 cP at 25° C. Higher viscosities can also be used (e.g., when the aqueous foam precursor composition includes a viscosity-modifying polymer).

Surfactant Package

The foamed composition can comprise a surfactant package comprising a primary foaming surfactant. The primary foaming surfactant can comprise, for example, an anionic surfactant, a cationic surfactant, or a non-ionic surfactant. In certain embodiments, the primary foaming surfactant can comprise an anionic surfactant or non-ionic surfactant. Optionally, the surfactant package can further comprise one or more secondary surfactants. The one or more secondary surfactants comprise one or more anionic surfactants, one or more cationic surfactants, one or more non-ionic surfactants, one or more zwitterionic surfactants, one or more amphoterics, one or more fluorinated surfactants, or any combination thereof. Suitable surfactants (and combinations of surfactants) are known in the art.

Suitable anionic surfactants include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant. In some embodiments, the anionic surfactant can comprise an olefin sulfonate surfactant. In some embodiments, the anionic surfactant can comprise a C14-C16 olefin sulfonate surfactant.

An "alkoxy carboxylate surfactant" or "alkoxy carboxylate" refers to a compound having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —COO$^-$ or acid or salt thereof including metal cations such as sodium. In embodiments, the alkoxy carboxylate surfactant can be defined by the formulae below:

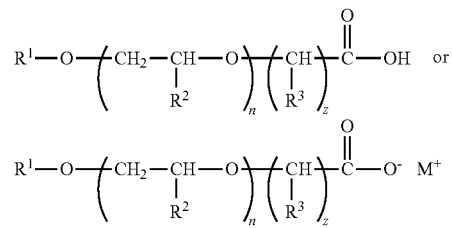

wherein R$^1$ is substituted or unsubstituted C6-C36 alkyl or substituted or unsubstituted aryl; R$^2$ is, independently for each occurrence within the compound, hydrogen or unsubstituted C1-C6 alkyl; R$^3$ is independently hydrogen or unsubstituted C1-C6 alkyl, n is an integer from 0 to 175, z is an integer from 1 to 6 and M$^+$ is a monovalent, divalent or trivalent cation. In some of these embodiments, R$^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—CH$_2$—CH(methyl)-O— linkers), attached in turn to from 0 to 100 ethyleneoxy groups (—CH$_2$—CH$_2$—O— linkers), attached in turn to —COO$^-$ or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium. In some embodiment, the alkoxy sulfate surfactant has the formula R—(BO)$_e$—(PO)$_f$-(EO)$_g$—SO$_3^-$ or acid or salt (including metal cations such as sodium) thereof, wherein R is C6-C32 alkyl, BO is —CH$_2$—CH(ethyl)-O—, PO is —CH$_2$—CH(methyl)-O—, and EO is —CH$_2$—CH$_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —CH$_2$—CH(ethyl)-O—, —CH$_2$—CH(methyl)-O—, or —CH$_2$—CH$_2$—O—) which, in turn is attached to -SO$_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —SO$_3^-$ or acid or salt thereof including metal cations such as sodium.

An "aryl sulfate surfactant" or "aryl sulfate" refers to a compound having an aryl group attached to —O—SO$_3^-$ or acid or salt thereof including metal cations such as sodium. An "aryl sulfonate surfactant" or "aryl sulfonate" refers to a compound having an aryl group attached to —SO$_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" refers to an unsaturated hydrocarbon compound comprising at least one carbon-carbon double bond and at least one SO$_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to the single-phase liquid surfactant package when the LPS injection fluid is intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disulfonate. In embodiments, the anionic surfactant can be benzenesulfonic acid, decyl(sulfophenoxy)-disodium salt; linear or branched C6-C36 alkyl: PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, the anionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di)sulfonate.

In some examples, the anionic surfactant can comprise a surfactant defined by the formula below:

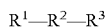

wherein R$^1$ comprises a branched or unbranched, saturated or unsaturated, cyclic or non-cyclic, hydrophobic carbon chain having 6-32 carbon atoms and an oxygen atom linking R$^1$ and R$^2$; R$^2$ comprises an alkoxylated chain comprising at least one oxide group selected from the group consisting of ethylene oxide, propylene oxide, butylene oxide, and combinations thereof; and R$^3$ comprises a branched or unbranched hydrocarbon chain comprising 2-12 carbon atoms and from 2 to 5 carboxylate groups.

In some examples, the anionic surfactant can comprise a surfactant defined by the formula below:

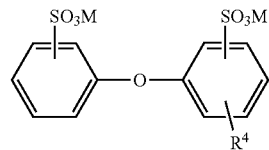

wherein R$^4$ is a branched or unbranched, saturated or unsaturated, cyclic or non-cyclic, hydrophobic carbon chain having 6-32 carbon atoms; and M represents a counterion (e.g., Na$^+$, K$^+$). In some embodiments, R$^4$ is a branched or unbranched, saturated or unsaturated, cyclic or non-cyclic, hydrophobic carbon chain having 6-16 carbon atoms.

Suitable non-ionic surfactants include compounds that can be added to increase wettability. In embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, in some embodiments, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9:EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11:9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32:PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464; WIPO Patent Application Nos. WO/2008/079855, WO/2012/027757 and WO/2011/094442; as well as U.S. Patent Application Nos. 2005/0199395, 2006/0185845, 2006/0189486, 2009/0270281, 2011/0046024, 2011/0100402, 2011/0190175, 2007/0191633, 2010/004843. 2011/0201531, 2011/0190174, 2011/0071057, 2011/0059873, 2011/0059872, 2011/0048721, 2010/0319920, 2010/0292110, and 2017/0198202, each of which is hereby incorporated by reference herein in its entirety for its description of example surfactants.

The primary foaming surfactant can have a concentration within the foamed composition of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the foamed composition. In some embodiments, the primary surfactant can have a concentration within the foamed composition of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the foamed composition. In particular embodiments, the primary surfactant can have a concentration within the foamed composition of less than 1%, less than 0.5%, less than 0.2%, less than 0.1%, less than 0.075%, or less than 0.05%.

The primary surfactant can have a concentration within the foamed composition ranging from any of the minimum values described above to any of the maximum values described above. For example, in some embodiments, the primary surfactant can have a concentration within the foamed composition of from 0.01% to 2.5% by weight (e.g., from 0.01% to 1.2%, from 1.2% to 2.5%, from 0.01% to 0.5%, from 0.5% to 1%, from 1% to 1.5%, from 1.5% to 2%, from 2% to 2.5%, from 0.1% to 2%, from 0.1% to 1.5%, from 0.25% to 1.5%, from 0.1% to 1%, or from 0.05% to 0.5% by weight), based on the total weight of the foamed composition.

When present, the one or more secondary surfactants can have a concentration within the foamed composition of at least 0.001% by weight (e.g., at least 0.005% by weight, at least 0.01% by weight, at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the foamed composition. In some embodiments, the one or more secondary surfactants can have a concentration within the foamed composition of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, 0.01% by weight or less, or 0.005% by weight or less), based on the total weight of the foamed composition. In particular embodiments, the one or more secondary surfactants can have a concentration within the foamed composition of less than 2%, less than 1.5%, less than 1%, less than 0.5%, less than 0.2%, less than 0.1%, less than 0.075%, less than 0.05%, or less than 0.01%.

When present, the one or more secondary surfactants can have a concentration within the foamed composition ranging from any of the minimum values described above to any of the maximum values described above. For example, in some embodiments, the one or more secondary surfactants can have a concentration within the foamed composition of from 0.001% to 2.5% by weight (e.g., from 0.001% to 1.5% by weight, or from 0.05% to 0.5% by weight), based on the total weight of the foamed composition.

In some embodiments, the primary surfactant and one or more secondary surfactants can be present in the foamed composition at a weight ratio of primary surfactant to one or more secondary surfactants of at least 1:1 (e.g., at least 2:1, at least 2.5:1, at least 3:1, at least 4:1, at least 5:1, at least 6:1, at least 7:1, at least 8:1, or at least 9:1). In some embodiments, the primary surfactant and one or more secondary surfactants can be present in the foamed composition in a weight ratio of primary surfactant to one or more secondary surfactants of 10:1 or less (e.g., 9:1 or less; 8:1 or less, 7:1 or less, 6:1 or less, 5:1 or less, 4:1 or less, 3:1 or less, 2.5:1 or less, or 2:1 or less).

The primary surfactant and one or more secondary surfactants can be present in the foamed composition in a weight ratio ranging from any of the minimum values described above to any of the maximum values described above. For example, the primary surfactant and one or more secondary surfactants can be present in the foamed composition in a weight ratio of primary surfactant to one or more secondary surfactants of from 1:1 to 10:1 (e.g., 1:1 to 5:1).

In other embodiments, the one or more secondary surfactants are absent (i.e., the primary surfactant is the only surfactant present in the foamed composition).

In some embodiments, the total concentration of all surfactants in the foamed composition (the total concentration of the primary surfactant and the one or more secondary surfactants in the foamed composition) can be at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, or at least 4.75% by weight), based on the total weight of the foamed composition. In some embodiments, the total concentration of all surfactants in the foamed composition (the total concentration of the primary surfactant and the one or more secondary surfactants in the foamed composition) can be 5% by weight or less (e.g., 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the foamed composition.

The total concentration of all surfactants in the foamed composition (the total concentration of the primary surfactant and the one or more secondary surfactants in the foamed composition) can range from any of the minimum values described above to any of the maximum values described above. For example, in some embodiments, the total concentration of all surfactants in the foamed composition (the total concentration of the primary surfactant and the one or more secondary surfactants in the foamed composition) can be from 0.01% by weight to 5% by weight (e.g., from 0.01% to 2.5% by weight, from 0.01% to 1% by weight, from 0.01% to 0.5% by weight, or from 0.01% to 0.25% by weight).

In some embodiments when the foamed composition is being injected into a horizontal well, the total concentration of all surfactants in the foamed composition (the total concentration of the primary surfactant and the one or more secondary surfactants in the foamed composition) can be from 0.01% to 1.5% by weight, from 0.01% to 1% by weight, or from 0.01% to 0.5% by weight.

In some embodiments when foamed composition is being injected into a vertical well, the total concentration of all surfactants in the foamed composition (the total concentration of the primary surfactant and the one or more secondary surfactants in the foamed composition) can be from 0.01% to 5% by weight, from 0.01% to 1% by weight, from 0.5% to 5% by weight, from 0.5% to 2.5% by weight, from 0.5% to 1.5% by weight, from 0.5% to 1% by weight, from 1% to 5% by weight, from 1% to 2.5% by weight, or from 1% to 1.5% by weight.

In some embodiments, the foamed composition can comprise a non-ionic surfactant and an anionic surfactant (e.g., a sulfonate or disulfonate). In some embodiments, the foamed composition can comprise a non-ionic surfactant and two or more anionic surfactants. In some embodiments, the foamed composition can comprise a non-ionic surfactant (e.g., a C6-C16 alkyl phenol ethoxylate, or a C6-C16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol) and a sulfonate surfactant (e.g., a C10-16 disulfonate, or a C16-28 IOS). Specific example surfactant packages that can be included in the foamed compositions described herein are shown in the table below.

| Example | Surfactants and Co-Surfactants in Surfactant Package (in weight percent of the foam composition) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 6 | 0.2% alkoxylated C6-C16 alcohol<br>0.033% carboxylate<br>0.066% disulfonate |
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate<br>0.05% alkyl polyglucoside |
| 9 | 0.1% alkoxylated C6-C16 alcohol<br>0.05% carboxylate<br>0.05% olefin sulfonate<br>0.1% alkyl polyglucoside |
| 10 | 0.15% alkoxylated C6-C16 alcohol<br>0.07% carboxylate<br>0.03% olefin sulfonate<br>0.1% alkyl polyglucoside |
| 11 | 0.1% alkoxylated C6-C16 alcohol<br>0.04% carboxylate<br>0.05% olefin sulfonate<br>0.03% disulfonate<br>0.1% alkyl polyglucoside |
| 12 | 0.1% alkoxylated C6-C16 alcohol<br>0.04% carboxylate<br>0.06% disulfonate<br>0.1% alkyl polyglucoside |
| 13 | 0.15% alkoxylated C6-C16 alcohol<br>0.15% alkoxylated alkylphenol<br>0.1% olefin sulfonate<br>0.1% Guerbet alkoxylated carboxylate |
| 14 | 0.125% alkoxylated C6-C16 alcohol<br>0.175% alkoxylated alkylphenol<br>0.1% olefin sulfonate<br>0.1% Guerbet alkoxylated carboxylate |
| 15 | 0.1% alkoxylated C6-C16 alcohol<br>0.2% alkoxylated alkylphenol<br>0.1% olefin sulfonate<br>0.1% Guerbet alkoxylated carboxylate |
| 16 | 0.12% alkoxylated C6-C16 alcohol<br>0.22% alkoxylated alkylphenol<br>0.08% olefin sulfonate<br>0.08% Guerbet alkoxylated carboxylate |
| 17 | 0.15% alkoxylated C6-C16 alcohol<br>0.15% alkoxylated alkylphenol<br>0.08% olefin sulfonate<br>0.06% Guerbet alkoxylated carboxylate<br>0.06% carboxylate |

-continued

| Example | Surfactants and Co-Surfactants in Surfactant Package (in weight percent of the foam composition) |
|---|---|
| 18 | 0.15% alkoxylated C6-C16 alcohol<br>0.15% alkoxylated alkylphenol<br>0.05% olefin sulfonate<br>0.1% Guerbet alkoxylated carboxylate<br>0.05% disulfonate |
| 19 | 0.5% olefin sulfonate<br>0.5% Guerbet alkoxylated carboxylate<br>0.55% glycosides or glucosides |
| 20 | 0.5% olefin sulfonate<br>0.5% Guerbet alkoxylated carboxylate<br>0.5% glycosides or glucosides<br>0.25% alkoxylated C6-C16 alcohol |
| 21 | 0.5% olefin sulfonate<br>0.5% Guerbet alkoxylated carboxylate<br>0.5% glycosides or glucosides<br>0.5% alkoxylated C6-C16 alcohol |
| 22 | 0.5% olefin sulfonate<br>0.5% Guerbet alkoxylated carboxylate<br>1% glycosides or glucosides<br>0.5% alkoxylated C6-C16 alcohol |
| 23 | 0.05% olefin sulfonate<br>0.05% Guerbet alkoxylated carboxylate<br>0.05% glycosides or glucosides<br>0.05% alkoxylated C6-C16 alcohol |
| 24 | 0.075% glycosides or glucosides<br>0.075% alkoxylated C6-C16 alcohol |
| 25 | 0.1% alkoxylated C6-C16 alcohol<br>0.05% disulfonate |
| 26 | 0.1% alkoxylated C6-C16 alcohol<br>0.05% disulfonate<br>0.03% hydroxyalkyl alkylammonium chloride |
| 27 | 0.03% olefin sulfonate<br>0.04% Guerbet alkoxylated carboxylate<br>0.08% glycosides or glucosides<br>0.05% alkoxylated C6-C16 alcohol |
| 28 | 0.4% olefin sulfonate<br>0.4% Guerbet alkoxylated carboxylate<br>0.7% glycosides or glucosides<br>0.5% alkoxylated C6-C16 alcohol |
| 29 | 0.05% olefin sulfonate<br>0.1% glycosides or glucosides<br>0.05% alkoxylated C6-C16 alcohol |
| 30 | 0.05% olefin sulfonate<br>0.1% alkyl polyglucoside<br>0.05% alkoxylated C6-C16 alcohol |
| 31 | 0.05% olefin sulfonate<br>0.1% glycosides or glucosides<br>0.05% alkoxylated C6-C16 alcohol |
| 32 | 0.05% olefin sulfonate<br>0.1% alkyl polyglucoside<br>0.05% alkoxylated C6-C16 alcohol |
| 33 | 0.05% olefin sulfonate<br>0.1% alkyl polyglucoside<br>0.05% alkoxylated C6-C16 alcohol |
| 34 | 0.05% olefin sulfonate<br>0.05% glycosides or glucosides<br>0.05% alkoxylated C6-C16 alcohol<br>0.05% carboxylate |
| 35 | 0.05% olefin sulfonate<br>0.05% glycosides or glucosides<br>0.05% alkoxylated C6-C16 alcohol<br>0.05% carboxylate |
| 36 | 0.05% olefin sulfonate<br>0.05% alkyl polyglucoside<br>0.05% alkoxylated C6-C16 alcohol |
| 37 | 0.06% olefin sulfonate<br>0.05% alkyl polyglucoside<br>0.04% alkoxylated C6-C16 alcohol |
| 38 | 0.04% olefin sulfonate<br>0.08% glycosides or glucosides<br>0.05% alkoxylated C6-C16 alcohol<br>0.03% disulfonate |
| 39 | 0.035% olefin sulfonate<br>0.075% glycosides or glucosides<br>0.05% alkoxylated C6-C16 alcohol<br>0.04% disulfonate |
| 40 | 0.035% olefin sulfonate<br>0.07% glycosides or glucosides<br>0.045% alkoxylated C6-C16 alcohol<br>0.05% disulfonate |
| 41 | 0.1% alkoxylated C6-C16 alcohol<br>0.1% disulfonate |
| 42 | 0.25% Guerbet alkoxylated carboxylate<br>0.25% olefin sulfonate<br>0.5% glycosides or glucosides<br>0.5% co-solvent |
| 43 | 0.075% alkoxylated C12-C22 alcohol<br>0.075% disulfonate |
| 44 | 0.075% alkoxylated C6-C16 Guerbet alcohol<br>0.075% disulfonate |
| 45 | 0.075% alkoxylated C6-C16 Guerbet alcohol<br>0.075% disulfonate |
| 46 | 0.075% alkoxylated C6-C16 alcohol<br>0.075% disulfonate |
| 47 | 0.075% disulfonate<br>0.075% alkoxylated C6-C16 alcohol |
| 48 | 0.0625% disulfonate<br>0.0875% alkoxylated C6-C16 alcohol |
| 49 | 0.055% disulfonate<br>0.095% alkoxylated C6-C16 alcohol |
| 50 | 0.075% disulfonate<br>0.075% alkoxylated C6-C16 alcohol |
| 51 | 1% alkoxylated C6-C16 alcohol<br>0.5% disulfonate |
| 52 | 1% alkoxylated C6-C16 alcohol |
| 53 | 1% alkoxylated C6-C16 alcohol<br>2.25% sulfosuccinate |
| 54 | 0.25% Guerbet alkoxylated carboxylate<br>1% alkoxylated C6-C16 alcohol<br>2.25% sulfosuccinate |
| 55 | 0.25% Guerbet alkoxylated carboxylate<br>1% alkoxylated alkylphenol<br>2.25% sulfosuccinate |
| 56 | 0.25% Guerbet alkoxylated carboxylate<br>1% alkoxylated C6-C16 alcohol |
| 57 | 0.25 Guerbet alkoxylated carboxylate<br>1% alkoxylated alkylphenol |
| 58 | 0.65% carboxylate<br>0.35% alkoxylated C6-C16 alcohol |
| 59 | 0.325% carboxylate<br>0.925% alkoxylated C6-C16 alcohol |
| 60 | 0.25% olefin sulfonate<br>1.0% alkoxylated C6-C16 alcohol |
| 61 | 0.15% olefin sulfonate<br>0.2% Guerbet alkoxylated carboxylate<br>0.92% carboxylate |
| 62 | 0.65% carboxylate<br>0.35% second carboxylate |
| 63 | 0.65% carboxylate<br>0.35% alkoxylated C6-C16 alcohol<br>1% olefin sulfonate |
| 64 | 1% alkoxylated alcohol<br>1% olefin sulfonate |
| 65 | 0.5% alkoxylated alcohol<br>0.5% olefin sulfonate<br>0.25% carboxylate |
| 66 | 0.6% co-solvent<br>0.6% olefin sulfonate |
| 67 | 0.6% co-solvent<br>0.3% disulfonate<br>0.3% olefin sulfonate |
| 68 | 0.6% Guerbet alkoxylated carboxylate<br>0.6% disulfonate |
| 69 | 0.6% co-solvent<br>0.4% disulfonate<br>0.2% olefin sulfonate |
| 70 | 0.5% alkoxylated C6-C16 alcohol<br>0.4% disulfonate<br>0.3% olefin sulfonate |
| 71 | 1% alkoxylated C6-C16 alcohol |
| 72 | 0.9% alkoxylated C6-C16 alcohol<br>0.6% disulfonate |

| Example | Surfactants and Co-Surfactants in Surfactant Package (in weight percent of the foam composition) |
|---|---|
| 73 | 0.4% alkoxylated C6-C16 alcohol<br>0.35% disulfonate<br>0.25% olefin sulfonate<br>0.5% co-solvent |
| 74 | 0.25% Guerbet alkoxylated carboxylate<br>0.5% alkoxylated C6-C16 alcohol<br>0.35% disulfonate<br>0.15% olefin sulfonate<br>0.35% co-solvent |
| 75 | 0.25% Guerbet alkoxylated carboxylate<br>0.25% alkoxylated C6-C16 alcohol<br>0.25% olefin sulfonate<br>0.25% co-solvent |
| 76 | 0.25% Guerbet alkoxylated carboxylate<br>0.25% alkoxylated C6-C16 alcohol<br>0.25% olefin sulfonate<br>0.25% alkoxylated alcohol |
| 77 | 0.25% Guerbet alkoxylated carboxylate<br>0.35% olefin sulfonate<br>0.5% alkoxylated alcohol |
| 78 | 0.25% Guerbet alkoxylated carboxylate<br>0.25% alkoxylated C6-C16 alcohol<br>0.15% olefin sulfonate<br>0.1% disulfonate<br>0.25% co-solvent |
| 79 | 0.25% Guerbet alkoxylated carboxylate<br>0.25% alkoxylated C6-C16 alcohol<br>0.25% olefin sulfonate<br>0.25% glycosides or glucosides<br>0.25% co-solvent<br>0.15% disulfonate |
| 80 | 0.25% Guerbet alkoxylated carboxylate<br>0.25% olefin sulfonate<br>0.5% glycosides or glucosides<br>0.25% co-solvent |
| 81 | 0.15% alkoxylated C12-C22 alcohol |
| 82 | 0.075% alkoxylated C12-C22 alcohol<br>0.075% disulfonate |
| 83 | 0.075% alkoxylated C12-C22 alcohol<br>0.075% disulfonate |
| 84 | 0.075% alkoxylated C12-C22 alcohol<br>0.075% alkoxylated C6-C16 Guerbet alcohol |
| 85 | 0.15% alkoxylated C6-C16 Guerbet alcohol |
| 86 | 0.075% alkoxylated C6-C16 Guerbet alcohol<br>0.075% disulfonate |
| 87 | 0.075% alkoxylated C6-C16 Guerbet alcohol<br>0.075% disulfonate<br>0.05% co-solvent |
| 88 | 0.1% alkoxylated C6-C16 alcohol<br>0.05% disulfonate |
| 89 | 1% alkoxylated C6-C16 alcohol<br>0.5% disulfonate |
| 90 | 0.075% alkoxylated C6-C16 Guerbet alcohol<br>0.075% disulfonate |
| 91 | 0.075% alkoxylated C6-C16 Guerbet alcohol<br>0.125% disulfonate |
| 92 | 0.075% alkoxylated C12-C22 alcohol<br>0.125% disulfonate |
| 93 | 0.075% alkoxylated C12-C22 alcohol<br>0.075% disulfonate |
| 94 | 0.075% alkoxylated C6-C16 Guerbet alcohol<br>0.075% disulfonate |
| 95 | 0.1% alkoxylated C6-C16 Guerbet alcohol<br>0.05% disulfonate |
| 96 | 0.075% alkoxylated C6-C16 Guerbet alcohol<br>0.075% disulfonate |
| 97 | 0.075% alkoxylated C6-C16 alcohol<br>0.075% disulfonate |
| 98 | 0.075% alkoxylated C6-C16 Guerbet alcohol<br>0.075% disulfonate |
| 99 | 0.1% alkoxylated C6-C16 alcohol<br>0.05% disulfonate |
| 100 | 0.09% alkoxylated C6-C16 alcohol<br>0.06% disulfonate |
| 101 | 0.1% alkoxylated C6-C16 alcohol<br>0.1% disulfonate<br>0.1% Guerbet alkoxylated carboxylate |
| 102 | 0.1% alkoxylated C6-C16 alcohol<br>0.1% disulfonate |
| 103 | 0.65% Guerbet alkoxylated carboxylate<br>0.35% olefin sulfonate<br>0.33% alkoxylated alkylphenol<br>0.5% co-solvent<br>0.25% second co-solvent |
| 104 | 0.075% alkoxylated C6-C16 alcohol<br>0.075% benzenesulfonic acid, decyl(sulfophenoxy)-disodium salt |
| 105 | 0.15% alkoxylated C6-C16 alcohol<br>0.05% benzenesulfonic acid, decyl(sulfophenoxy)-disodium salt |
| 106 | 0.09% alkoxylated C6-C28 alcohol<br>0.06% disulfonate |
| 107 | 0.1% alkoxylated C6-C28 alcohol<br>0.1% disulfonate |
| 108 | 0.15% alkoxylated C6-C28 alcohol<br>0.075% disulfonate |
| 109 | 0.2% alkoxylated C6-C28 alcohol<br>0.066% disulfonate |
| 110 | 0.2% alkoxylated C6-C28 alcohol<br>0.05% olefin sulfonate |
| 111 | 0.15% alkoxylated C6-C28 alcohol<br>0.05% olefin sulfonate<br>0.05% alkyl polyglucoside |
| 112 | 0.1% alkoxylated C6-C28 alcohol<br>0.05% olefin sulfonate<br>0.1% alkyl polyglucoside |
| 113 | 0.15% alkoxylated C6-C28 alcohol<br>0.03% olefin sulfonate<br>0.1% alkyl polyglucoside |
| 114 | 0.1% alkoxylated C6-C28 alcohol<br>0.05% olefin sulfonate<br>0.03% disulfonate<br>0.1% alkyl polyglucoside |
| 115 | 0.1% alkoxylated C6-C28 alcohol<br>0.06% disulfonate<br>0.1% alkyl polyglucoside |
| 116 | 0.15% alkoxylated C6-C28 alcohol<br>0.15% alkoxylated alkylphenol<br>0.1% olefin sulfonate |
| 117 | 0.125% alkoxylated C6-C28 alcohol<br>0.175% alkoxylated alkylphenol<br>0.1% olefin sulfonate |
| 118 | 0.1% alkoxylated C6-C28 alcohol<br>0.2% alkoxylated alkylphenol<br>0.1% olefin sulfonate |
| 119 | 0.12% alkoxylated C6-C28 alcohol<br>0.22% alkoxylated alkylphenol<br>0.08% olefin sulfonate |
| 120 | 0.15% alkoxylated C6-C28 alcohol<br>0.15% alkoxylated alkylphenol<br>0.08% olefin sulfonate |
| 121 | 0.15% alkoxylated C6-C28 alcohol<br>0.15% alkoxylated alkylphenol<br>0.05% olefin sulfonate<br>0.05% disulfonate |
| 122 | 0.5% olefin sulfonate<br>0.55% glycosides or glucosides |
| 123 | 0.5% olefin sulfonate<br>0.5% glycosides or glucosides<br>0.25% alkoxylated C6-C28 alcohol |
| 124 | 0.5% olefin sulfonate<br>0.5% glycosides or glucosides<br>0.5% alkoxylated C6-C28 alcohol |
| 125 | 0.5% olefin sulfonate<br>1% glycosides or glucosides<br>0.5% alkoxylated C6-C28 alcohol |
| 126 | 0.05% olefin sulfonate<br>0.05% glycosides or glucosides<br>0.05% alkoxylated C6-C28 alcohol |

-continued

| Example | Surfactants and Co-Surfactants in Surfactant Package (in weight percent of the foam composition) |
|---|---|
| 127 | 0.075% glycosides or glucosides<br>0.075% alkoxylated C6-C28 alcohol |
| 128 | 0.1% alkoxylated C6-C28 alcohol<br>0.05% disulfonate |
| 129 | 0.1% alkoxylated C6-C28 alcohol<br>0.05% disulfonate<br>0.03% hydroxyalkyl alkylammonium chloride |
| 130 | 0.03% olefin sulfonate<br>0.08% glycosides or glucosides<br>0.05% alkoxylated C6-C28 alcohol |
| 131 | 0.4% olefin sulfonate<br>0.7% glycosides or glucosides<br>0.5% alkoxylated C6-C28 alcohol |
| 132 | 0.05% olefin sulfonate<br>0.1% glycosides or glucosides<br>0.05% alkoxylated C6-C28 alcohol |
| 133 | 0.05% olefin sulfonate<br>0.1% alkyl polyglucoside<br>0.05% alkoxylated C6-C28 alcohol |
| 134 | 0.05% olefin sulfonate<br>0.1% glycosides or glucosides<br>0.05% alkoxylated C6-C28 alcohol |
| 135 | 0.05% olefin sulfonate<br>0.1% alkyl polyglucoside<br>0.05% alkoxylated C6-C28 alcohol |
| 136 | 0.05% olefin sulfonate<br>0.1% alkyl polyglucoside<br>0.05% alkoxylated C6-C28 alcohol |
| 137 | 0.05% olefin sulfonate<br>0.05% glycosides or glucosides<br>0.05% alkoxylated C6-C28 alcohol |
| 138 | 0.05% olefin sulfonate<br>0.05% glycosides or glucosides<br>0.05% alkoxylated C6-C28 alcohol |
| 139 | 0.05% olefin sulfonate<br>0.05% alkyl polyglucoside<br>0.05% alkoxylated C6-C28 alcohol |
| 140 | 0.06% olefin sulfonate<br>0.05% alkyl polyglucoside<br>0.04% alkoxylated C6-C28 alcohol |
| 141 | 0.04% olefin sulfonate<br>0.08% glycosides or glucosides<br>0.05% alkoxylated C6-C28 alcohol<br>0.03% disulfonate |
| 142 | 0.035% olefin sulfonate<br>0.075% glycosides or glucosides<br>0.05% alkoxylated C6-C28 alcohol<br>0.04% disulfonate |
| 143 | 0.035% olefin sulfonate<br>0.07% glycosides or glucosides<br>0.045% alkoxylated C6-C28 alcohol<br>0.05% disulfonate |
| 144 | 0.1% alkoxylated C6-C28 alcohol<br>0.1% disulfonate |
| 145 | 0.25% olefin sulfonate<br>0.5% glycosides or glucosides<br>0.5% co-solvent |
| 146 | 0.075% alkoxylated C12-C22 alcohol<br>0.075% disulfonate |
| 147 | 0.075% alkoxylated C6-C28 Guerbet alcohol<br>0.075% disulfonate |
| 148 | 0.075% alkoxylated C6-C28 Guerbet alcohol<br>0.075% disulfonate |
| 149 | 0.075% alkoxylated C6-C28 alcohol<br>0.075% disulfonate |
| 150 | 0.075% disulfonate<br>0.075% alkoxylated C6-C28 alcohol |
| 151 | 0.0625% disulfonate<br>0.0875% alkoxylated C6-C28 alcohol |
| 152 | 0.055% disulfonate<br>0.095% alkoxylated C6-C28 alcohol |
| 153 | 0.075% disulfonate<br>0.075% alkoxylated C6-C28 alcohol |
| 154 | 1% alkoxylated C6-C28 alcohol<br>0.5% disulfonate |
| 155 | 1% alkoxylated C6-C28 alcohol |
| 156 | 1% alkoxylated C6-C28 alcohol<br>2.25% sulfosuccinate |
| 157 | 1% alkoxylated C6-C28 alcohol<br>2.25% sulfosuccinate |
| 158 | 1% alkoxylated alkylphenol<br>2.25% sulfosuccinate |
| 159 | 0.25% olefin sulfonate<br>1.0% alkoxylated C6-C28 alcohol |
| 160 | 0.35% alkoxylated C6-C28 alcohol<br>1% olefin sulfonate |
| 161 | 0.5% alkoxylated alcohol<br>0.5% olefin sulfonate |
| 162 | 0.5% alkoxylated C6-C28 alcohol<br>0.4% disulfonate<br>0.3% olefin sulfonate |
| 163 | 1% alkoxylated C6-C28 alcohol |
| 164 | 0.9% alkoxylated C6-C28 alcohol<br>0.6% disulfonate |
| 165 | 0.4% alkoxylated C6-C28 alcohol<br>0.35% disulfonate<br>0.25% olefin sulfonate<br>0.5% co-solvent |
| 166 | 0.5% alkoxylated C6-C28 alcohol<br>0.35% disulfonate<br>0.15% olefin sulfonate<br>0.35% co-solvent |
| 167 | 0.25% alkoxylated C6-C28 alcohol<br>0.25% olefin sulfonate<br>0.25% co-solvent |
| 168 | 0.25% alkoxylated C6-C28 alcohol<br>0.25% olefin sulfonate |
| 169 | 0.25% alkoxylated alcohol<br>0.35% olefin sulfonate<br>0.5% alkoxylated alcohol |
| 170 | 0.25% alkoxylated C6-C28 alcohol<br>0.15% olefin sulfonate<br>0.1% disulfonate<br>0.25% co-solvent |
| 171 | 0.25% alkoxylated C6-C28 alcohol<br>0.25% olefin sulfonate<br>0.25% glycosides or glucosides<br>0.25% co-solvent<br>0.15% disulfonate |
| 172 | 0.25% olefin sulfonate<br>0.5% glycosides or glucosides<br>0.25% co-solvent |
| 173 | 0.15% alkoxylated C12-C22 alcohol |
| 174 | 0.075% alkoxylated C12-C22 alcohol<br>0.075% disulfonate |
| 175 | 0.075% alkoxylated C12-C22 alcohol<br>0.075% disulfonate |
| 176 | 0.075% alkoxylated C12-C22 alcohol<br>0.075% alkoxylated C6-C28 Guerbet alcohol |
| 177 | 0.15% alkoxylated C6-C28 Guerbet alcohol |
| 178 | 0.075% alkoxylated C6-C28 Guerbet alcohol<br>0.075% disulfonate |
| 179 | 0.075% alkoxylated C6-C28 Guerbet alcohol<br>0.075% disulfonate<br>0.05% co-solvent |
| 180 | 0.1% alkoxylated C6-C28 alcohol<br>0.05% disulfonate |
| 181 | 1% alkoxylated C6-C28 alcohol<br>0.5% disulfonate |
| 182 | 0.075% alkoxylated C6-C28 Guerbet alcohol<br>0.075% disulfonate |
| 183 | 0.075% alkoxylated C6-C28 Guerbet alcohol<br>0.125% disulfonate |
| 184 | 0.075% alkoxylated C12-C22 alcohol<br>0.125% disulfonate |
| 185 | 0.075% alkoxylated C12-C22 alcohol<br>0.075% disulfonate |
| 186 | 0.075% alkoxylated C6-C28 Guerbet alcohol<br>0.075% disulfonate |
| 187 | 0.1% alkoxylated C6-C28 Guerbet alcohol<br>0.05% disulfonate |

| Example | Surfactants and Co-Surfactants in Surfactant Package (in weight percent of the foam composition) |
|---|---|
| 188 | 0.075% alkoxylated C6-C28 Guerbet alcohol<br>0.075% disulfonate |
| 189 | 0.075% alkoxylated C6-C28 alcohol<br>0.075% disulfonate |
| 190 | 0.075% alkoxylated C6-C28 Guerbet alcohol<br>0.075% disulfonate |
| 191 | 0.1% alkoxylated C6-C28 alcohol<br>0.05% disulfonate |
| 192 | 0.09% alkoxylated C6-C28 alcohol<br>0.06% disulfonate |
| 193 | 0.1% alkoxylated C6-C28 alcohol<br>0.1% disulfonate |
| 194 | 0.1% alkoxylated C6-C28 alcohol<br>0.1% disulfonate |
| 195 | 0.35% olefin sulfonate<br>0.33% alkoxylated alkylphenol<br>0.5% co-solvent<br>0.25% second co-solvent |
| 196 | 0.075% alkoxylated C6-C28 alcohol<br>0.075% benzenesulfonic acid, decyl(sulfophenoxy)-disodium salt |
| 197 | 0.15% alkoxylated C6-C28 alcohol<br>0.05% benzenesulfonic acid, decyl(sulfophenoxy)-disodium salt |
| 198 | 0.09% alkoxylated C12-C32 alcohol<br>0.06% disulfonate |
| 199 | 0.1% alkoxylated C12-C32 alcohol<br>0.1% carboxylate<br>0.1% disulfonate |
| 200 | 0.15% alkoxylated C12-C32 alcohol<br>0.075% carboxylate<br>0.075% disulfonate |
| 201 | 0.2% alkoxylated C12-C32 alcohol<br>0.1% carboxylate |
| 202 | 0.2% alkoxylated C12-C32 alcohol<br>0.033% carboxylate<br>0.066% disulfonate |
| 203 | 0.2% alkoxylated C12-C32 alcohol<br>0.033% carboxylate<br>0.066% disulfonate |
| 204 | 0.2% alkoxylated C12-C32 alcohol<br>0.05% carboxylate<br>0.05% olefin sulfonate |
| 205 | 0.15% alkoxylated C12-C32 alcohol<br>0.05% carboxylate<br>0.05% olefin sulfonate<br>0.05% alkyl polyglucoside |
| 206 | 0.1% alkoxylated C12-C32 alcohol<br>0.05% carboxylate<br>0.05% olefin sulfonate<br>0.1% alkyl polyglucoside |
| 207 | 0.15% alkoxylated C12-C32 alcohol<br>0.07% carboxylate<br>0.03% olefin sulfonate<br>0.1% alkyl polyglucoside |
| 208 | 0.1% alkoxylated C12-C32 alcohol<br>0.04% carboxylate<br>0.05% olefin sulfonate<br>0.03% disulfonate<br>0.1% alkyl polyglucoside |
| 209 | 0.1% alkoxylated C12-C32 alcohol<br>0.04% carboxylate<br>0.06% disulfonate<br>0.1% alkyl polyglucoside |
| 210 | 0.15% alkoxylated C12-C32 alcohol<br>0.15% alkoxylated alkylphenol<br>0.1% olefin sulfonate<br>0.1% Guerbet alkoxylated carboxylate |
| 211 | 0.125% alkoxylated C12-C32 alcohol<br>0.175% alkoxylated alkylphenol<br>0.1% olefin sulfonate<br>0.1% Guerbet alkoxylated carboxylate |
| 212 | 0.1% alkoxylated C12-C32 alcohol<br>0.2% alkoxylated alkylphenol<br>0.1% olefin sulfonate<br>0.1% Guerbet alkoxylated carboxylate |
| 213 | 0.12% alkoxylated C12-C32 alcohol<br>0.22% alkoxylated alkylphenol<br>0.08% olefin sulfonate<br>0.08% Guerbet alkoxylated carboxylate |
| 214 | 0.15% alkoxylated C12-C32 alcohol<br>0.15% alkoxylated alkylphenol<br>0.08% olefin sulfonate<br>0.06% Guerbet alkoxylated carboxylate<br>0.06% carboxylate |
| 215 | 0.15% alkoxylated C12-C32 alcohol<br>0.15% alkoxylated alkylphenol<br>0.05% olefin sulfonate<br>0.1% Guerbet alkoxylated carboxylate<br>0.05% disulfonate |
| 216 | 0.5% olefin sulfonate<br>0.5% Guerbet alkoxylated carboxylate<br>0.5% glycosides or glucosides<br>0.25% alkoxylated C12-C32 alcohol |
| 217 | 0.5% olefin sulfonate<br>0.5% Guerbet alkoxylated carboxylate<br>0.5% glycosides or glucosides<br>0.5% alkoxylated C12-C32 alcohol |
| 218 | 0.5% olefin sulfonate<br>0.5% Guerbet alkoxylated carboxylate<br>1% glycosides or glucosides<br>0.5% alkoxylated C12-C32 alcohol |
| 219 | 0.05% olefin sulfonate<br>0.05% Guerbet alkoxylated carboxylate<br>0.05% glycosides or glucosides<br>0.05% alkoxylated C12-C32 alcohol<br>0.075% glycosides or glucosides<br>0.075% alkoxylated C12-C32 alcohol |
| 220 | 0.1% alkoxylated C12-C32 alcohol<br>0.05% disulfonate |
| 221 | 0.1% alkoxylated C12-C32 alcohol<br>0.05% disulfonate |
| 222 | 0.1% alkoxylated C12-C32 alcohol<br>0.05% disulfonate<br>0.03% hydroxyalkyl alkylammonium chloride |
| 223 | 0.03% olefin sulfonate<br>0.04% Guerbet alkoxylated carboxylate<br>0.08% glycosides or glucosides<br>0.05% alkoxylated C12-C32 alcohol |
| 224 | 0.4% olefin sulfonate<br>0.4% Guerbet alkoxylated carboxylate<br>0.7% glycosides or glucosides<br>0.5% alkoxylated C12-C32 alcohol |
| 225 | 0.05% olefin sulfonate<br>0.1% glycosides or glucosides<br>0.05% alkoxylated C12-C32 alcohol |
| 226 | 0.05% olefin sulfonate<br>0.1% alkyl polyglucoside<br>0.05% alkoxylated C12-C32 alcohol |
| 227 | 0.05% olefin sulfonate<br>0.1% glycosides or glucosides<br>0.05% alkoxylated C12-C32 alcohol |
| 228 | 0.05% olefin sulfonate<br>0.1% alkyl polyglucoside<br>0.05% alkoxylated C12-C32 alcohol |
| 229 | 0.05% olefin sulfonate<br>0.1% alkyl polyglucoside<br>0.05% alkoxylated C12-C32 alcohol |
| 230 | 0.05% olefin sulfonate<br>0.05% glycosides or glucosides<br>0.05% alkoxylated C12-C32 alcohol<br>0.05% carboxylate |
| 231 | 0.05% olefin sulfonate<br>0.05% glycosides or glucosides<br>0.05% alkoxylated C12-C32 alcohol<br>0.05% carboxylate |
| 232 | 0.05% olefin sulfonate<br>0.05% alkyl polyglucoside<br>0.05% alkoxylated C12-C32 alcohol |
| 233 | 0.06% olefin sulfonate<br>0.05% alkyl polyglucoside<br>0.04% alkoxylated C12-C32 alcohol |
| 234 | 0.04% olefin sulfonate<br>0.08% glycosides or glucosides |

-continued

| Example | Surfactants and Co-Surfactants in Surfactant Package (in weight percent of the foam composition) |
|---|---|
| 235 | 0.05% alkoxylated C12-C32 alcohol<br>0.03% disulfonate<br>0.035% olefin sulfonate<br>0.075% glycosides or glucosides |
| 236 | 0.05% alkoxylated C12-C32 alcohol<br>0.04% disulfonate<br>0.035% olefin sulfonate<br>0.07% glycosides or glucosides |
| 237 | 0.045% alkoxylated C12-C32 alcohol<br>0.05% disulfonate |
| 238 | 0.1% alkoxylated C12-C32 alcohol<br>0.1% disulfonate |
| 239 | 0.075% alkoxylated C12-C32 alcohol<br>0.075% disulfonate |
| 240 | 0.075% alkoxylated C12-C32 Guerbet alcohol<br>0.075% disulfonate |
| 241 | 0.075% alkoxylated C12-C32 Guerbet alcohol<br>0.075% disulfonate |
| 242 | 0.075% alkoxylated C12-C32 alcohol<br>0.075% disulfonate |
| 243 | 0.075% disulfonate<br>0.075% alkoxylated C12-C32 alcohol |
| 244 | 0.0625% disulfonate<br>0.0875% alkoxylated C12-C32 alcohol |
| 245 | 0.055% disulfonate<br>0.095% alkoxylated C12-C32 alcohol |
| 246 | 0.075% disulfonate<br>0.075% alkoxylated C12-C32 alcohol |
| 247 | 1% alkoxylated C12-C32 alcohol<br>0.5% disulfonate |
| 248 | 1% alkoxylated C12-C32 alcohol<br>1% alkoxylated C12-C32 alcohol<br>2.25% sulfosuccinate |
| 249 | 0.25% Guerbet alkoxylated carboxylate<br>1% alkoxylated C12-C32 alcohol<br>2.25% sulfosuccinate |
| 250 | 0.25% Guerbet alkoxylated carboxylate<br>1% alkoxylated C12-C32 alcohol |
| 251 | 0.65% carboxylate<br>0.35% alkoxylated C12-C32 alcohol |
| 252 | 0.325% carboxylate<br>0.925% alkoxylated C12-C32 alcohol |
| 253 | 0.25% olefin sulfonate<br>1.0% alkoxylated C12-C32 alcohol |
| 254 | 0.65% carboxylate<br>0.35% alkoxylated C12-C32 alcohol<br>1% olefin sulfonate |
| 255 | 0.5% alkoxylated C12-C32 alcohol<br>0.4% disulfonate<br>0.3% olefin sulfonate |
| 256 | 0.9% alkoxylated C12-C32 alcohol<br>0.6% disulfonate |
| 257 | 0.4% alkoxylated C12-C32 alcohol<br>0.35% disulfonate<br>0.25% olefin sulfonate<br>0.5% co-solvent |
| 258 | 0.25% Guerbet alkoxylated carboxylate<br>0.5% alkoxylated C12-C32 alcohol<br>0.35% disulfonate<br>0.15% olefin sulfonate<br>0.35% co-solvent |
| 259 | 0.25% Guerbet alkoxylated carboxylate<br>0.25% alkoxylated C12-C32 alcohol<br>0.25% olefin sulfonate<br>0.25% co-solvent |
| 260 | 0.25% Guerbet alkoxylated carboxylate<br>0.25% alkoxylated C12-C32 alcohol<br>0.25% olefin sulfonate<br>0.25% alkoxylated alcohol |
| 261 | 0.25% Guerbet alkoxylated carboxylate<br>0.25% alkoxylated C12-C32 alcohol<br>0.15% olefin sulfonate<br>0.1% disulfonate<br>0.25% co-solvent |
| 262 | 0.25% Guerbet alkoxylated carboxylate<br>0.25% alkoxylated C12-C32 alcohol<br>0.25% olefin sulfonate<br>0.25% glycosides or glucosides<br>0.25% co-solvent<br>0.15% disulfonate |
| 263 | 0.15% alkoxylated C12-C32 alcohol |
| 264 | 0.075% alkoxylated C12-C32 alcohol<br>0.075% disulfonate |
| 265 | 0.075% alkoxylated C12-C32 alcohol<br>0.075% disulfonate |
| 266 | 0.075% alkoxylated C12-C32 alcohol<br>0.075% alkoxylated C6-C16 Guerbet alcohol |
| 267 | 0.15% alkoxylated C12-C32 Guerbet alcohol |
| 268 | 0.075% alkoxylated C12-C32 Guerbet alcohol<br>0.075% disulfonate |
| 269 | 0.075% alkoxylated C12-C32 Guerbet alcohol<br>0.075% disulfonate<br>0.05% co-solvent |
| 270 | 0.1% alkoxylated C12-C32 alcohol<br>0.05% disulfonate |
| 271 | 1% alkoxylated C12-C32 alcohol<br>0.5% disulfonate |
| 272 | 0.075% alkoxylated C12-C32 Guerbet alcohol<br>0.075% disulfonate |
| 273 | 0.075% alkoxylated C12-C32 Guerbet alcohol<br>0.125% disulfonate |
| 274 | 0.075% alkoxylated C12-C32 alcohol<br>0.125% disulfonate |
| 275 | 0.075% alkoxylated C12-C32 alcohol<br>0.075% disulfonate |
| 276 | 0.075% alkoxylated C12-C32 Guerbet alcohol<br>0.075% disulfonate |
| 277 | 0.1% alkoxylated C12-C32 Guerbet alcohol<br>0.05% disulfonate |
| 278 | 0.075% alkoxylated C12-C32 Guerbet alcohol<br>0.075% disulfonate |
| 279 | 0.075% alkoxylated C12-C32 alcohol<br>0.075% disulfonate |
| 280 | 0.075% alkoxylated C12-C32 Guerbet alcohol<br>0.075% disulfonate |
| 281 | 0.1% alkoxylated C12-C32 alcohol<br>0.05% disulfonate |
| 282 | 0.09% alkoxylated C12-C32 alcohol<br>0.06% disulfonate |
| 283 | 0.1% alkoxylated C12-C32 alcohol<br>0.1% disulfonate<br>0.1% Guerbet alkoxylated carboxylate |
| 284 | 0.1% alkoxylated C12-C32 alcohol<br>0.1% disulfonate |
| 285 | 0.65% Guerbet alkoxylated carboxylate<br>0.35% olefin sulfonate<br>0.33% alkoxylated alkylphenol<br>0.5% co-solvent<br>0.25% second co-solvent |
| 286 | 0.075% alkoxylated C12-C32 alcohol<br>0.075% benzenesulfonic acid, decyl(sulfophenoxy)-disodium salt |
| 287 | 0.15% alkoxylated C12-C32 alcohol<br>0.05% benzenesulfonic acid, decyl(sulfophenoxy)-disodium salt |
| 288 | 0.09% alkoxylated C12-C32 alcohol<br>0.06% disulfonate |
| 289 | 0.1% alkoxylated C12-C32 alcohol<br>0.1% disulfonate |
| 290 | 0.15% alkoxylated C12-C32 alcohol<br>0.075% disulfonate |
| 291 | 0.2% alkoxylated C12-C32 alcohol<br>0.066% disulfonate |
| 292 | 0.2% alkoxylated C12-C32 alcohol<br>0.05% olefin sulfonate |
| 293 | 0.15% alkoxylated C12-C32 alcohol<br>0.05% olefin sulfonate<br>0.05% alkyl polyglucoside |
| 294 | 0.1% alkoxylated C12-C32 alcohol<br>0.05% olefin sulfonate<br>0.1% alkyl polyglucoside |

| Example | Surfactants and Co-Surfactants in Surfactant Package (in weight percent of the foam composition) |
|---|---|
| 295 | 0.15% alkoxylated C12-C32 alcohol<br>0.03% olefin sulfonate<br>0.1% alkyl polyglucoside |
| 296 | 0.1% alkoxylated C12-C32 alcohol<br>0.05% olefin sulfonate<br>0.03% disulfonate<br>0.1% alkyl polyglucoside |
| 297 | 0.1% alkoxylated C12-C32 alcohol<br>0.06% disulfonate<br>0.1% alkyl polyglucoside |
| 298 | 0.15% alkoxylated C12-C32 alcohol<br>0.15% alkoxylated alkylphenol<br>0.1% olefin sulfonate |
| 299 | 0.125% alkoxylated C12-C32 alcohol<br>0.175% alkoxylated alkylphenol<br>0.1% olefin sulfonate |
| 300 | 0.1% alkoxylated C12-C32 alcohol<br>0.2% alkoxylated alkylphenol<br>0.1% olefin sulfonate |
| 301 | 0.12% alkoxylated C12-C32 alcohol<br>0.22% alkoxylated alkylphenol<br>0.08% olefin sulfonate |
| 302 | 0.15% alkoxylated C12-C32 alcohol<br>0.15% alkoxylated alkylphenol<br>0.08% olefin sulfonate |
| 303 | 0.15% alkoxylated C12-C32 alcohol<br>0.15% alkoxylated alkylphenol<br>0.05% olefin sulfonate<br>0.05% disulfonate |
| 304 | 0.5% olefin sulfonate<br>0.5% glycosides or glucosides<br>0.25% alkoxylated C12-C32 alcohol |
| 305 | 0.5% olefin sulfonate<br>0.5% glycosides or glucosides<br>0.5% alkoxylated C12-C32 alcohol |
| 306 | 0.5% olefin sulfonate<br>1% glycosides or glucosides<br>0.5% alkoxylated C12-C32 alcohol |
| 307 | 0.05% olefin sulfonate<br>0.05% glycosides or glucosides<br>0.05% alkoxylated C12-C32 alcohol |
| 308 | 0.075% glycosides or glucosides<br>0.075% alkoxylated C12-C32 alcohol |
| 309 | 0.1% alkoxylated C12-C32 alcohol<br>0.05% disulfonate |
| 10 | 0.1% alkoxylated C12-C32 alcohol<br>0.05% disulfonate<br>0.03% hydroxyalkyl alkylammonium chloride |
| 311 | 0.03% olefin sulfonate<br>0.08% glycosides or glucosides<br>0.05% alkoxylated C12-C32 alcohol |
| 312 | 0.4% olefin sulfonate<br>0.7% glycosides or glucosides<br>0.5% alkoxylated C12-C32 alcohol |
| 313 | 0.05% olefin sulfonate<br>0.1% glycosides or glucosides<br>0.05% alkoxylated C12-C32 alcohol |
| 314 | 0.05% olefin sulfonate<br>0.1% alkyl polyglucoside<br>0.05% alkoxylated C12-C32 alcohol |
| 315 | 0.05% olefin sulfonate<br>0.1% glycosides or glucosides<br>0.05% alkoxylated C12-C32 alcohol |
| 316 | 0.05% olefin sulfonate<br>0.1% alkyl polyglucoside<br>0.05% alkoxylated C12-C32 alcohol |
| 317 | 0.05% olefin sulfonate<br>0.1% alkyl polyglucoside<br>0.05% alkoxylated C12-C32 alcohol |
| 318 | 0.05% olefin sulfonate<br>0.05% glycosides or glucosides<br>0.05% alkoxylated C12-C32 alcohol |
| 319 | 0.05% olefin sulfonate<br>0.05% glycosides or glucosides<br>0.05% alkoxylated C12-C32 alcohol |
| 320 | 0.05% olefin sulfonate<br>0.05% alkyl polyglucoside<br>0.05% alkoxylated C12-C32 alcohol |
| 321 | 0.06% olefin sulfonate<br>0.05% alkyl polyglucoside<br>0.04% alkoxylated C12-C32 alcohol |
| 322 | 0.04% olefin sulfonate<br>0.08% glycosides or glucosides<br>0.05% alkoxylated C12-C32 alcohol<br>0.03% disulfonate |
| 323 | 0.035% olefin sulfonate<br>0.075% glycosides or glucosides<br>0.05% alkoxylated C12-C32 alcohol<br>0.04% disulfonate |
| 324 | 0.035% olefin sulfonate<br>0.07% glycosides or glucosides<br>0.045% alkoxylated C12-C32 alcohol<br>0.05% disulfonate |
| 325 | 0.1% alkoxylated C12-C32 alcohol<br>0.1% disulfonate |
| 326 | 0.075% alkoxylated C12-C32 alcohol<br>0.075% disulfonate |
| 327 | 0.075% alkoxylated C12-C32 Guerbet alcohol<br>0.075% disulfonate |
| 328 | 0.075% alkoxylated C12-C32 Guerbet alcohol<br>0.075% disulfonate |
| 329 | 0.075% alkoxylated C12-C32 alcohol<br>0.075% disulfonate |
| 330 | 0.075% disulfonate<br>0.075% alkoxylated C12-C32 alcohol |
| 321 | 0.0625% disulfonate<br>0.0875% alkoxylated C12-C32 alcohol |
| 322 | 0.055% disulfonate<br>0.095% alkoxylated C12-C32 alcohol |
| 323 | 0.075% disulfonate<br>0.075% alkoxylated C12-C32 alcohol |
| 324 | 1% alkoxylated C12-C32 alcohol<br>0.5% disulfonate |
| 325 | 1% alkoxylated C12-C32 alcohol |
| 326 | 1% alkoxylated C12-C32 alcohol<br>2.25% sulfosuccinate |
| 327 | 1% alkoxylated C12-C32 alcohol<br>2.25% sulfosuccinate |
| 328 | 0.25% olefin sulfonate<br>1.0% alkoxylated C12-C32 alcohol |
| 329 | 0.35% alkoxylated C12-C32 alcohol<br>1% olefin sulfonate |
| 330 | 0.5% alkoxylated C12-C32 alcohol<br>0.4% disulfonate<br>0.3% olefin sulfonate |
| 331 | 0.9% alkoxylated C12-C32 alcohol<br>0.6% disulfonate |
| 332 | 0.4% alkoxylated C12-C32 alcohol<br>0.35% disulfonate<br>0.25% olefin sulfonate<br>0.5% co-solvent |
| 333 | 0.5% alkoxylated C12-C32 alcohol<br>0.35% disulfonate<br>0.15% olefin sulfonate<br>0.35% co-solvent |
| 334 | 0.25% alkoxylated C12-C32 alcohol<br>0.25% olefin sulfonate<br>0.25% co-solvent |
| 335 | 0.25% alkoxylated C12-C32 alcohol<br>0.25% olefin sulfonate<br>0.25% alkoxylated alcohol |
| 336 | 0.25% alkoxylated C12-C32 alcohol<br>0.15% olefin sulfonate<br>0.1% disulfonate<br>0.25% co-solvent |
| 337 | 0.25% alkoxylated C12-C32 alcohol<br>0.25% olefin sulfonate<br>0.25% glycosides or glucosides<br>0.25% co-solvent<br>0.15% disulfonate |

| Example | Surfactants and Co-Surfactants in Surfactant Package (in weight percent of the foam composition) |
|---|---|
| 338 | 0.15% alkoxylated C12-C32 alcohol |
| 339 | 0.075% alkoxylated C12-C32 alcohol<br>0.075% disulfonate |
| 340 | 0.075% alkoxylated C12-C32 alcohol<br>0.075% disulfonate |
| 341 | 0.075% alkoxylated C12-C32 alcohol<br>0.075% alkoxylated C12-C32 Guerbet alcohol |
| 342 | 0.15% alkoxylated C12-C32 Guerbet alcohol |
| 343 | 0.075% alkoxylated C12-C32 Guerbet alcohol<br>0.075% disulfonate |
| 344 | 0.075% alkoxylated C12-C32 Guerbet alcohol<br>0.075% disulfonate<br>0.05% co-solvent |
| 345 | 0.1% alkoxylated C12-C32 alcohol<br>0.05% disulfonate |
| 346 | 1% alkoxylated C12-C32 alcohol<br>0.5% disulfonate |
| 347 | 0.075% alkoxylated C12-C32 Guerbet alcohol<br>0.075% disulfonate |
| 348 | 0.075% alkoxylated C12-C32 Guerbet alcohol<br>0.125% disulfonate |
| 349 | 0.075% alkoxylated C12-C32 alcohol<br>0.125% disulfonate |
| 350 | 0.075% alkoxylated C12-C32 alcohol<br>0.075% disulfonate |
| 351 | 0.075% alkoxylated C12-C32 Guerbet alcohol<br>0.075% disulfonate |
| 352 | 0.1% alkoxylated C12-C32 Guerbet alcohol<br>0.05% disulfonate |
| 353 | 0.075% alkoxylated C12-C32 Guerbet alcohol<br>0.075% disulfonate |
| 354 | 0.075% alkoxylated C12-C32 alcohol<br>0.075% disulfonate |
| 355 | 0.075% alkoxylated C12-C32 Guerbet alcohol<br>0.075% disulfonate |
| 356 | 0.1% alkoxylated C12-C32 alcohol<br>0.05% disulfonate |
| 357 | 0.09% alkoxylated C12-C32 alcohol<br>0.06% disulfonate |
| 358 | 0.1% alkoxylated C12-C32 alcohol<br>0.1% disulfonate |
| 359 | 0.1% alkoxylated C12-C32 alcohol<br>0.1% disulfonate |
| 360 | 0.075% alkoxylated C12-C32 alcohol<br>0.075% benzenesulfonic acid, decyl(sulfophenoxy)-disodium salt |
| 361 | 0.15% alkoxylated C12-C32 alcohol<br>0.05% benzenesulfonic acid, decyl(sulfophenoxy)-disodium salt |
| 362 | 0.2% Guerbet alkylated C2 alcohol<br>0.8% disulfonate<br>5% NaCl |
| 363 | 0.6% sulfonate<br>0.4% alkylated C2 alcohol<br>5% NaCl |
| 364 | 0.8% sulfonate<br>0.2% alkylated C2 alcohol<br>5% NaCl |
| 365 | 0.6% sulfonate<br>0.4% alkylated C2 alcohol<br>0.5% co-solvent poly(oxyalkylene) glycol ether<br>9% NaCl |
| 366 | 0.6% sulfonate<br>0.4% alkylated C2 alcohol<br>0.5% co-solvent poly(oxyalkylene) glycol ether<br>10% NaCl |
| 367 | 0.3% sulfonate<br>0.3% second sulfonate<br>0.4% alkylated C2 alcohol<br>7% NaCl |
| 368 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1% acetic acid |
| 369 | 1% alkoxylated C6-C16 alcohol<br>1% olefin sulfonate<br>2% sodium tetraborate<br>1% acetic acid |
| 370 | 1% alkoxylated C6-C16 alcohol<br>0.75% olefin sulfonate<br>0.5% disulfonate<br>2% sodium tetraborate<br>1% acetic acid |
| 371 | 1% alkoxylated C6-C16 alcohol<br>0.75% olefin sulfonate<br>0.3% disulfonate<br>2% sodium tetraborate<br>1% acetic acid |
| 372 | 0.5% alkoxylated C6-C16 alcohol<br>0.85% olefin sulfonate<br>0.15% disulfonate<br>2% sodium tetraborate<br>1% acetic acid |
| 373 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1% citric acid |
| 374 | 1% alkoxylated C6-C16 alcohol<br>0.75% olefin sulfonate<br>0.3% disulfonate<br>2% sodium tetraborate<br>1% citric acid |
| 375 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1.1% citric acid |
| 376 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>2% sodium tetraborate<br>1% acetic acid |
| 377 | 0.5% C6-C16 alcohol alkoxylated carboxylate<br>0.25% alkoxylated C6-C16 alcohol<br>0.15% olefin sulfonate<br>0.35% disulfonate<br>2% sodium tetraborate<br>1% acetic acid |
| 378 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>0.02% cetyl betaine<br>2% sodium tetraborate<br>1% acetic acid |

In some embodiments, the one or more surfactants in the foamed composition can decrease the interfacial tension (IFT) of the foamed composition with hydrocarbons in the reservoir. Reducing the IFT can decrease pressure required to drive the foamed composition into the formation matrix. In addition, decreasing the IFT reduces water block during production, facilitating the flow of hydrocarbons from the formation to the wellbore (e.g., facilitating the flow of hydrocarbons back through the fractures and to the wellbore). In this way, hydrocarbon recovery can be facilitated by the one or more surfactants in the foamed composition.

In some embodiments, the one or more surfactants in the foamed composition can change the wettability of the reservoir. In particular, in embodiments where the reservoir is oil-wet or mixed-wet, the one or more surfactants in the foamed composition can make the reservoir more water-wet. By increasing the water-wetness of the reservoir, the formation will imbibe injected foamed composition into the formation matrix, leading to a corresponding flow of hydrocarbon from regions within the formation back to the fracture. In this way, hydrocarbon recovery can be facilitated by the one or more surfactants in the foamed composition.

Acids

In some embodiments, the foamed composition can comprise an acid. The acid can comprise any suitable acid known in the art. In some embodiments, the acid can comprise a strong acid, such as HCl. In other embodiments, the acid can comprise a weak acid, such as an organic acid.

In some embodiments, the foamed composition can have a pH of at least 2 (e.g., at least 2.5, at least 3, at least 3.5, at least 4, at least 4.5, at least 5, or at least 5.5). In some embodiments, the foamed composition can have a pH of 6 or less (e.g., 5.5 or less, 5 or less, 4.5 or less, 4 or less, 3.5 or less, 3 or less, or 2.5 or less).

The foamed composition can have a pH ranging from any of the minimum values described above to any of the maximum values described above. For example, in some embodiments, the foamed composition can have a pH of from 2 to 6 (e.g., from 2 to 5.5, from 2 to 4, or from 2 to 3).

Alkali Agents

In some embodiments, the foamed composition can comprise an alkali agent.

The term "alkali agent" is used herein according to its conventional meaning and includes basic, ionic salts of alkali metals or alkaline earth metals. Alkali agents as provided herein are typically capable of reacting with an unrefined petroleum acid (e.g., an acid in crude oil (reactive oil)) to form soap (a surfactant salt of a fatty acid) in situ. These in situ generated soaps serve as a source of surfactants capable of reducing the interfacial tension of hydrocarbons with an aqueous composition. Examples of suitable alkali agents include, but are not limited to, sodium hydroxide, potassium hydroxide, sodium carbonate, potassium carbonate, sodium silicate, sodium metaborate, and salts of EDTA (e.g., EDTA tetrasodium salt or EDTA tetrapotassium salt). In one embodiment, the alkali agent is NaOH. In other embodiments, the alkali agent is $Na_2CO_3$.

In some embodiments, the foamed composition can have a pH of at least 8 (e.g., at least 8.5, at least 9, at least 9.5, at least 10, at least 10.5, at least 11, or at least 11.5). In some embodiments, the foamed composition can have a pH of 12 or less (e.g., 11.5 or less, 11 or less, 10.5 or less, 10 or less, 9.5 or less, 9 or less, or 8.5 or less).

The foamed composition can have a pH ranging from any of the minimum values described above to any of the maximum values described above. For example, in some embodiments, the foamed composition can have a pH of from 8 to 12 (e.g., from 8.5 to 12, from 9 to 12, from 8.5 to 11.5, from 9 to 11.5, from 8.5 to 11, or from 9 to 11).

Co-Solvents

In some embodiments, the foamed composition can comprise a co-solvent.

Suitable co-solvents include alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent can comprise alkyl ethoxylate (C1-C6)-XEO X=1-30-linear or branched. In some embodiments, the co-solvent can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), diethylene glycol, polyethylene glycol (PEG), or any combination thereof. In some embodiments, the co-solvent can comprise ethylene glycol butyl ether (EGBE) and diethylene glycol.

In some embodiments, the co-solvent can be present in the foamed composition in an amount of 0.01% or more by weight, based on total weight of the foamed composition (e.g., 0.05% or more, 0.1% or more, 0.15% or more, 0.2% or more, 0.25% or more, 0.3% or more, 0.35% or more, 0.4% or more, 0.45% or more, 0.5% or more, 0.6% or more, 0.7% or more, 0.8% or more, 0.9% or more, 1% or more, 1.25% or more, 1.5% or more, 1.75% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 11% or more, 12% or more, 13% or more, 14% or more, 15% or more, 16% or more, 17% or more, 18% or more, 19% or more, 20% or more, 21% or more, 22% or more, 23% or more, or 24% or more). In some embodiments, the co-solvent can be present in the foamed composition in an amount of 25% or less by weight, based on total weight of the foamed composition (e.g., 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.75% or less, 1.5% or less, 1.25% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, or 0.1% or less). The amount of co-solvent present can range from any of the minimum values described above to any of the maximum values described above. In some embodiments, the co-solvent can be present in the foamed composition in an amount of from 0.01% to 25% by weight, based on the total weight of the foamed composition (e.g., from 0.01% to 20%, from 0.01% to 15%, from 0.01% to 10%, from 0.01% to 5%, from 0.01% to 1%, from 0.01% to 0.7%, from 0.25% to 0.7%, from 0.1% to 25%, from 0.1% to 10%, or from 0.5% to 5%).

Viscosity-Modifying Polymers

In some embodiments, the foamed composition can comprise a viscosity-modifying polymer.

Examples of viscosity-modifying polymer are known in the art. Examples of suitable polymers include biopolymers such as polysaccharides. For example, polysaccharides can be xanthan gum, scleroglucan, guar gum, a mixture thereof (e.g., any modifications thereof such as a modified chain), etc. Indeed, the terminology "mixtures thereof" or "combinations thereof" can include "modifications thereof" herein. Examples of suitable synthetic polymers include polyacrylamides. Examples of suitable polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the synthetic polymer is polyacrylic acid (PAA). In one embodiment, the synthetic polymer is polyvinyl alcohol (PVA). Copolymers may be made of any combination or mixture above, for example, a combination of NVP and ATBS.

In certain embodiments, the viscosity-modifying polymer can comprise a biopolymer. In certain embodiments, the viscosity-modifying polymer can comprise a polysaccharide. In certain embodiments, the viscosity modifying polymer can comprise xanthan gum.

In certain embodiments, the viscosity-modifying polymer can comprise an uncrosslinked polymer.

In some embodiments, the viscosity-modifying polymer can be present in the foamed composition in an amount of 0.01% or more by weight, based on total weight of the foamed composition (e.g., 0.05% or more, 0.1% or more, 0.15% or more, 0.2% or more, 0.25% or more, 0.3% or more, 0.35% or more, 0.4% or more, 0.45% or more, 0.5% or more, 0.6% or more, 0.7% or more, 0.8% or more, 0.9% or more, 1% or more, 1.25% or more, 1.5% or more, 1.75% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 11% or more, 12% or more, 13% or more, 14% or more, 15% or more, 16% or more, 17% or more, 18% or more, 19% or more, 20% or more, 21% or more, 22% or more, 23% or more, or 24% or more). In some embodiments, the viscosity-modifying polymer can be present in the foamed composition in an amount of 25% or less by weight, based on total weight of the foamed composition (e.g., 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.75% or less, 1.5% or less, 1.25% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, or 0.1% or less). The amount of viscosity-modifying polymer present can range from any of the minimum values described above to any of the maximum values described above. In some embodiments, the viscosity-modifying polymer can be present in the foamed composition in an amount of from 0.01% to 25% by weight, based on the total weight of the foamed composition (e.g., from 0.01% to 20%, from 0.01% to 15%, from 0.01% to 10%, from 0.01% to 5%, from 0.01% to 1%, from 0.01% to 0.5%, from 0.01% to 0.25%, from 0.1% to 25%, from 0.1% to 10%, or from 0.5% to 5% by weight).

Foam Stabilizers

In some embodiments, the foamed composition can further comprise a foam stabilizer. Foam stabilizers are known in the art and include, for example, crosslinkers, particulate stabilizers, or any combination thereof.

In some embodiments, the foamed composition can further include a crosslinker, such as a borate crosslinking agent, a Zr crosslinking agent, a Ti crosslinking agent, an Al crosslinking agent, an organic crosslinker, or any combination thereof. In some examples, the foam stabilizer can comprise a crosslinker and the viscosity-modifying polymer and the crosslinker can be present in a weight ratio of 10:1 or more (e.g., 15:1 or more, 20:1 or more, 25:1 or more, 30:1 or more, 35:1 or more, 40:1 or more, 45:1 or more, 50:1 or more, 55:1 or more, 60:1 or more, 65:1 or more, 70:1 or more, 75:1 or more, 80:1 or more, 85:1 or more, or 90:1 or more). In some examples, the viscosity-modifying polymer and the crosslinker can be present in a weight ratio of 100:1 or less (e.g., 95:1 or less, 90:1 or less, 85:1 or less, 80:1 or less, 75:1 or less, 70:1 or less, 65:1 or less, 60:1 or less, 55:1 or less, 50:1 or less, 45:1 or less, 40:1 or less, 35:1 or less, 30:1 or less, 25:1 or less, or 20:1 or less). The weight ratio at which the viscosity-modifying polymer and the crosslinker are present can range from any of the minimum values described above to any of the maximum values described above. For example, the viscosity-modifying polymer and the crosslinker can be present in a weight ratio of from 10:1 to 100:1 (e.g., from 10:1 to 55:1, from 55:1 to 100:1, from 10:1 to 40:1, from 40:1 to 70:1, from 70:1 to 100:1, from 20:1 to 100:1, from 10:1 to 90:1, from 20:1 to 90:1, from 10:1 to 75:1, or from 25:1 to 50:1).

In some embodiments, the foamed composition can further include a particulate stabilizer (e.g., nanoparticles or microparticles). Examples of suitable nanoparticles and microparticles are known in the art, and include, for example, nickel oxide, alumina, silica (surface-modified), a silicate, iron oxide ($Fe_3O_4$), titanium oxide, impregnated nickel on alumina, synthetic clay, natural clay, iron zinc sulfide, magnetite, iron octanoate, or any combination thereof. In some examples, the foamed composition can further include a particulate stabilizer comprising a synthetic clay, a natural clay, or any combination thereof, such as attapulgite, bentonite, or any combination thereof. Other examples of suitable nanoparticles are described, for example, in U.S. Pat. No. 10,266,750, which is hereby incorporated by reference in its entirety.

In some examples, the foamed composition can include a particulate stabilizer having an average particle size of 100 nanometers (nm) or more (e.g., 200 nm or more, 300 nm or more, 400 nm or more, 500 nm or more, 750 nm or more, 1 micrometer (micron, μm) or more, 2 μm or more, 3 μm or more, 4 μm or more, 5 μm or more, 10 μm or more, 15 μm or more, or 20 μm or more). In some examples, the particulate stabilizer can have an average particle size of 25 μm or less (e.g., 20 μm or less, 15 μm or less, 10 μm or less, 5 μm or less, 4 μm or less, 3 μm or less, 2 μm or less, 1 μm or less, 750 nm or less, 500 nm or less, 400 nm or less, or 300 nm or less). The average particle size of the particulate stabilizer can range from any of the minimum values described above to any of the maximum values described above. For example, the particulate stabilizer can have an average particle size of from 100 nm to 25 μm (e.g., from 100 nm to 10 μm, from 100 nm to 5 μm, from 100 nm to 100 μm, from 100 μm to 500 μm, from 100 nm to 200 μm, from 100 nm to 150 μm, from 100 nm to 100 μm, from 100 nm to 50 μm, or from 100 nm to 10 μm).

In some embodiments, the foam stabilizer can be present in the foamed composition in an amount of 0.01% or more by weight, based on total weight of the foamed composition (e.g., 0.05% or more, 0.1% or more, 0.15% or more, 0.2% or more, 0.25% or more, 0.3% or more, 0.35% or more, 0.4% or more, 0.45% or more, 0.5% or more, 0.6% or more, 0.7% or more, 0.8% or more, 0.9% or more, 1% or more, 1.25% or more, 1.5% or more, 1.75% or more, 2% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, or 9% or more). In some embodiments, the foam stabilizer can be present in an amount of 10% or less by weight, based on total weight of the foamed composition (e.g., 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, 1.75% or less, 1.5% or less, 1.25% or less, 1% or less, 0.9% or less, 0.8% or less, 0.7% or less, 0.6% or less, 0.5% or less, 0.45% or less, 0.4% or less, 0.35% or less, 0.3% or less, 0.25% or less, 0.2% or less, 0.15% or less, or 0.1% or less). The amount of foam stabilizer present in the foamed composition can range from any of the minimum values described above to any of the maximum values described above. For example, the foam stabilizer can be present in the foamed composition in an amount of from 0.01% to 10% by weight, based on total weight of the foamed composition (e.g., from 0.01% to 5%, from 5% to 10%, from 0.01% to 2%, from 2% to 4%, from 4% to 6%, from 6% to 8%, from 8% to 10%, from 0.01% to 8%, from 1% to 10%, from 1% to 8%, from 1.5% to 3.5%, from 2% to 3%, or from 0.01% to 2.5%).

Breakers

In some embodiments, the foamed composition can further comprise a breaker. In some embodiments, the foamed composition can further comprise an oxidizer to break the polymer. In certain embodiments, the period of time in step (c) comprises a period of time effective to allow the foamed composition to break.

Example Foamed Compositions

In some embodiments, the foamed composition can comprise: a surfactant package comprising a primary foaming surfactant (e.g., an olefin sulfonate surfactant, such as a C14-C16 olefin sulfonate surfactant), such as from 0.25% to 1.5% by weight primary foaming surfactant (e.g., from 0.5% to 1%) based on the total weight of the foamed composition; a viscosity-modifying polymer (e.g., a biopolymer such as xanthan), such as from 0.01% to 1% by weight viscosity-modifying polymer (e.g. from 0.01% to 0.5%) based on the total weight of the foamed composition; and water (e.g., brine), such as 50% or more by weight water (e.g., from 65% to 85%) based on the total weight of the foamed composition.

In some embodiments, the foamed composition can comprise: a surfactant package comprising a primary foaming surfactant (e.g., an olefin sulfonate surfactant, such as a C14-C16 olefin sulfonate surfactant), such as from 0.25% to 1.5% by weight primary foaming surfactant (e.g., from 0.5% to 1%) based on the total weight of the foamed composition; a foam stabilizer (e.g., a particulate stabilizer such as a synthetic and/or natural clay, for example attapulgite), such as from 0.01% to 5% by weight foam stabilizer (e.g., from 2% to 3%) based on the total weight of the foamed composition; and water (e.g., brine), such as 50% or more by weight water (e.g., from 65% to 85%) based on the total weight of the foamed composition.

In some embodiments, the foamed composition can comprise: a surfactant package comprising a primary foaming surfactant (e.g., an olefin sulfonate surfactant, such as a C14-C16 olefin sulfonate surfactant), such as from 0.25% to 1.5% by weight primary foaming surfactant (e.g., from 0.5% to 1%) based on the total weight of the foamed composition; a co-solvent (e.g., a glycol ether such as ethylene glycol butyl ether, a polyalkylene glycol such as diethylene glycol, or any combination thereof), such as from 0.01% to 1% by weight co-solvent (e.g., from 0.25 to 0.7%) based on the total weight of the foamed composition; and water (e.g., brine), such as 50% or more by weight water (e.g., from 65% to 85%) based on the total weight of the foamed composition.

In some embodiments, the foamed composition can comprise: a surfactant package comprising a primary foaming surfactant (e.g., an olefin sulfonate surfactant, such as a C14-C16 olefin sulfonate surfactant), such as from 0.25% to 1.5% by weight primary foaming surfactant (e.g., from 0.5% to 1%) based on the total weight of the foamed composition; a viscosity-modifying polymer (e.g., a biopolymer such as xanthan), such as from 0.01% to 1% by weight viscosity-modifying polymer (e.g. from 0.01% to 0.5%) based on the total weight of the foamed composition; a foam stabilizer (e.g., a particulate stabilizer such as a synthetic and/or natural clay, for example attapulgite), such as from 0.01% to 5% by weight foam stabilizer (e.g., from 2% to 3%) based on the total weight of the foamed composition; and water (e.g., brine), such as 50% or more by weight water (e.g., from 65% to 85%) based on the total weight of the foamed composition.

In some embodiments, the foamed composition can comprise: a surfactant package comprising a primary foaming surfactant (e.g., an olefin sulfonate surfactant, such as a C14-C16 olefin sulfonate surfactant), such as from 0.25% to 1.5% by weight primary foaming surfactant (e.g., from 0.5% to 1%) based on the total weight of the foamed composition; a co-solvent (e.g., a glycol ether such as ethylene glycol butyl ether, a polyalkylene glycol such as diethylene glycol, or any combination thereof), such as from 0.01% to 1% by weight co-solvent (e.g., from 0.25 to 0.7%) based on the total weight of the foamed composition; a viscosity-modifying polymer (e.g., a biopolymer such as xanthan), such as from 0.01% to 1% by weight viscosity-modifying polymer (e.g. from 0.01% to 0.5%) based on the total weight of the foamed composition; and water (e.g., brine), such as 50% or more by weight water (e.g., from 65% to 85%) based on the total weight of the foamed composition.

In some embodiments, the foamed composition can comprise: a surfactant package comprising a primary foaming surfactant (e.g., an olefin sulfonate surfactant, such as a C14-C16 olefin sulfonate surfactant), such as from 0.25% to 1.5% by weight primary foaming surfactant (e.g., from 0.5% to 1%) based on the total weight of the foamed composition; a co-solvent (e.g., a glycol ether such as ethylene glycol butyl ether, a polyalkylene glycol such as diethylene glycol, or any combination thereof), such as from 0.01% to 1% by weight co-solvent (e.g., from 0.25 to 0.7%) based on the total weight of the foamed composition; a viscosity-modifying polymer (e.g., a biopolymer such as xanthan), such as from 0.01% to 1% by weight viscosity-modifying polymer (e.g. from 0.01% to 0.5%) based on the total weight of the foamed composition; a foam stabilizer (e.g., a particulate stabilizer such as a synthetic and/or natural clay, for example attapulgite), such as from 0.01% to 5% by weight foam stabilizer (e.g., from 2% to 3%) based on the total weight of the foamed composition; and water (e.g., brine), such as 50% or more by weight water (e.g., from 65% to 85%) based on the total weight of the foamed composition.

Screening Methods

Also provided are methods for screening foam precursor compositions for use in stimulating an unconventional subterranean formation comprising hydrocarbons. Such method methods can be used to formulate an appropriate aqueous foam precursor composition (and by extension foam composition) for use in foam stimulation performed in a particular subterranean formation; to assess the suitability of an aqueous foam precursor composition (and by extension foam composition) for use in foam stimulation performed in a particular subterranean formation; to generate an aqueous foam precursor composition (and by extension foam composition) that provides improved results when used in a foam stimulation operation performed in a particular subterranean formation; or any combination thereof.

These methods can comprise (a) selecting a surfactant package comprising a primary foaming surfactant and optionally one or more secondary surfactants; (b) preparing a foam composition comprising: the surfactant package, wherein the primary foaming surfactant is present in an amount of from 0.1% to 2.5% by weight (e.g., from 0.25% to 1.5% or from 0.5% to 1% by weight), based on the total weight of the foam precursor composition; and water, wherein the water is present in an amount of 50% or more by weight, based on the total weight of the foam precursor composition; and (c) determining an interfacial tension (IFT) between the foam precursor composition and the hydrocarbons present in the unconventional subterranean formation.

An IFT of less than 0.5 dynes/cm, such as an IFT of from 0.01 dynes/cm to 0.5 dynes/cm, an IFT of from 0.05 dynes/cm to 0.3 dynes/cm, an IFT of from 0.08 dynes/cm to 0.3 dynes/cm, or an IFT of from 0.1 dynes/cm to 0.2 dynes/cm, can indicate that the foam precursor composition is suitable for use in stimulating the unconventional subterranean. In such embodiments, the method can further comprise utilizing the aqueous foam precursor composition in a foam stimulation operation described herein. Such methods can comprise (d) combining the foam precursor solution with an expansion gas to form a foamed composition above ground, and injecting the foamed composition through an existing wellbore into the unconventional subterranean formation; or combining the foam precursor solution with an expansion gas downhole to form a foamed composition in situ within an existing wellbore; (e) allowing the foamed composition to contact a rock matrix of the unconventional subterranean formation for a period of time; and (f) producing fluids from the unconventional subterranean formation through the wellbore.

An IFT of greater than 0.5 dynes/cm can indicate that the foam precursor composition is not suitable for use in stimulating the unconventional subterranean (e.g., that the composition can or should be further optimized prior to use in a foam stimulation operation). In such embodiments, the method can further comprise preparing an alternative foam precursor composition differing in some respect from the first foam precursor composition tested, and evaluating the IFT of the alternative foam precursor composition to determine if the alternative foam precursor composition is suitable for use. This process can be performed iteratively to arrive at a foam precursor composition having an IFT which suggests that the composition will produce a foam particularly suitable for use in a foam stimulation operation. Such methods can comprise (d) repeating steps (a)-(c) to arrive at a second foam precursor composition comprising a second surfactant package having a different composition than the surfactant package present in the first foam precursor composition, wherein the IFT of the second foam precursor composition is less than 0.5 dynes/cm, such as an IFT of from 0.05 dynes/cm to 0.5 dynes/cm, (e) combining the second foam precursor solution with an expansion gas to form a foamed composition above ground, and injecting the foamed composition through an existing wellbore into the unconventional subterranean formation; or combining the second foam precursor solution with an expansion gas downhole to form a foamed composition in situ within an existing wellbore; (f) allowing the foamed composition to contact a rock matrix of the unconventional subterranean formation for a period of time; and (g) producing fluids from the unconventional subterranean formation through the wellbore

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Example 1: Evaluation of Foam Precursor Compositions—Interfacial Tension, Foam Stability, and Apparent Viscosity A oil (0.81 g/cm$^3$ at 22° C.) was used for the oil phase. The surfactants used to form compositions included: anionic: a disulfonate surfactant, sulfonate surfactant A, and sulfonate surfactant B; non-ionic: an alkoxylated alcohol, an alkoxylated Guerbet alcohol; and a co-solvent. Brine used: 5-10% NaCl brine. Nitrogen gas was used for DBR cell and apparent viscosity tests. Air was as the gas used for surface tension and bottle tests.

Formulations Tested 30 different formulations tested, and six formulations were identified for further study. Surfactants were selected that alter wettability in tight rock conditions.

Concentrated stock solutions prepared by weight/weight percent were used for solution preparation. Formulations and bulk solutions used for future tests were then mixed by volume. The composition of the six formulations selected for further study (RTC-02, RTC-06, RTC-07, RTC-08, RTC-09, and RTC-12) are included in the table below.

| Sample | Components of Formulation (weight percent) | IFT (vs. A oil) dynes/cm | ST (vs. air) dynes/cm |
|---|---|---|---|
| RTC-02 | 0.2% C18-C32 Alkoxylated Guerbet Alcohol<br>0.8% C10-C16 disulfonate surfactant<br>5% NaCl | 1.64 | 30.86 |
| RTC-06 | 0.6% C20-C28 sulfonate surfactant A<br>0.4% C10-C22 alkylated alcohol<br>5% NaCl | 0.2 | 26.58 |
| RTC-07 | 0.8% C20-C28 sulfonate surfactant A<br>0.2% C10-C22 alkylated alcohol<br>5% NaCl | 0.8 | 24.69 |

-continued

| Sample | Components of Formulation (weight percent) | IFT (vs. A oil) dynes/cm | ST (vs. air) dynes/cm |
|---|---|---|---|
| RTC-08 | 0.6% C20-C28 sulfonate surfactant A<br>0.4% C10-C22 alkylated alcohol<br>0.5% co-solvent<br>9% NaCl | 0.1 | 25.19 |
| RTC-09 | 0.6% C20-C28 sulfonate surfactant A<br>0.4% C10-C22 alkylated alcohol<br>0.5% co-solvent<br>10% NaCl | 0.08 | 26.79 |
| RTC-12 | 0.3% C20-C28 sulfonate surfactant A<br>0.3% C10-C16 sulfonate surfactant B<br>0.4% C10-C22 alkylated alcohol<br>7% NaCl | 0.011 | 33.24 |

Measurement of Interfacial Tension (IFT) and Surface Tension (ST)

Interfacial tension characterization was performed on a Rame-Hart Goniometer for measured values above 1 dynes/cm. The droplet phase (oil for interfacial tension, surfactant solution for surface tension) is dispensed from a 22-gauge needle to produce a stable droplet in a cuvette filled with an external phase (surfactant solution for interfacial tension, air for surface tension). DROPImage software provided by Rame-Hart was then used to calculate the surface tension using the Young-Laplace equation.

If the interfacial tension is lower than 1 dynes/cm, a Grace Instruments M6500 spinning drop tensiometer was used. Values were determined using Vonnegut's equation at rotational speeds above 5,000 rpm after adequate stabilization time. A measurement was taken if the droplet length was 4 times the droplet thickness. Measurements for the IFT and ST of RTC-02, RTC-06, RTC-07, RTC-08, RTC-09, and RTC-12 are included in the table above.

Three-Phase Bottle Test Conditions

Bottle Tests were used as a screening protocol prior to DBR and dynamic tests to determine stability with time. Two and three-phase tests can be tested with this method. A vial of known volume is prepared by dispensing aqueous solution of desired quantity. If a three-phase test is desired, crude oil of known quantity is dispensed after the aqueous solution. The vial is then sealed, and a liquid height is logged as an initial condition. The vial is then shaken for 60 seconds to generate foam. The height is then logged over time until the normalized height reaches 50% or a cut-off time is reached.

The three-phase bottle test was performed at 22° C. under ambient pressure. The oil phase included A oil and was 1% of the total volume. The aqueous phase included RTC-06, RTC-07, RTC-08, RTC-09, or RTC-12 and was 33% of the total volume. The gas phase included air and was 66% of the total volume.

Figure 13:
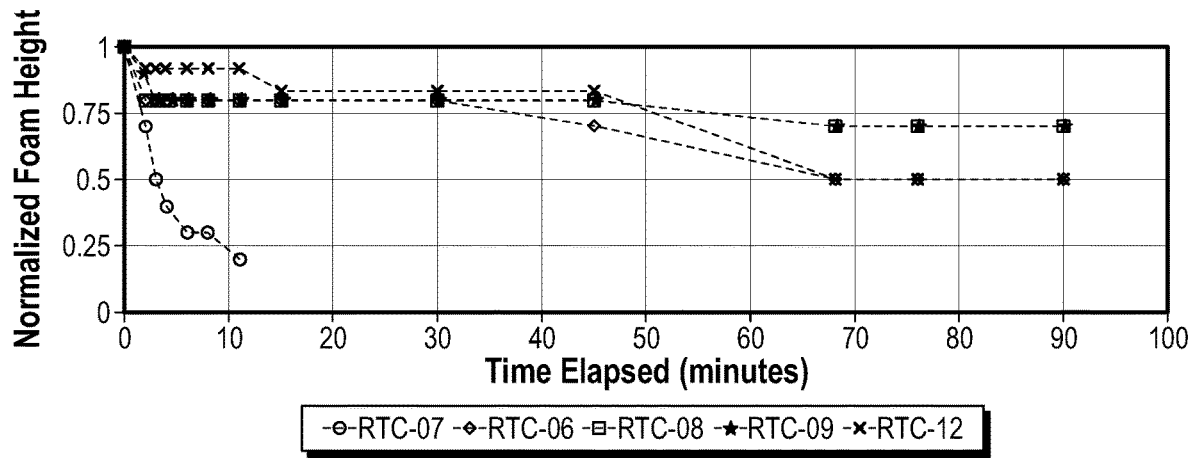
FIG. 13. A graph of normalized foam height versus time at 22° C. for the three-phase bottle test.
Figure 14:
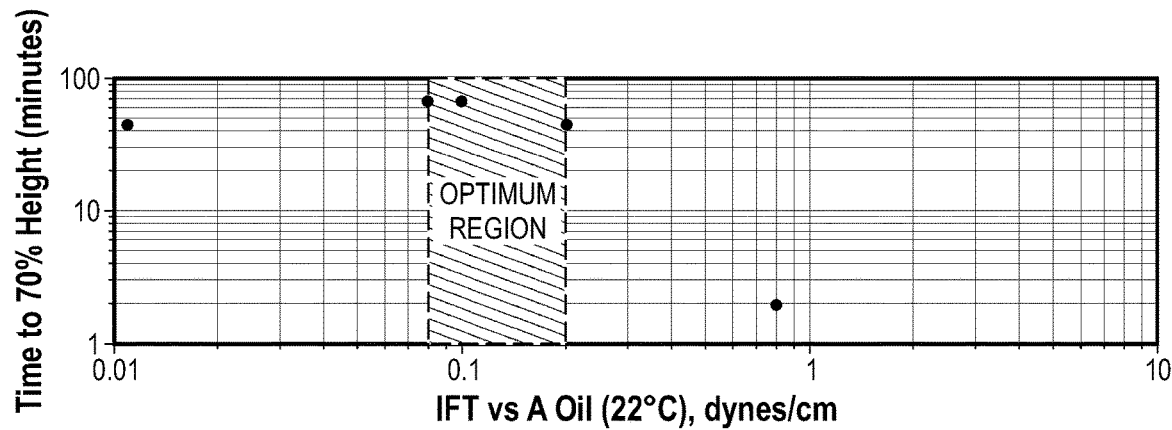
FIG. 14. A graph showing IFT versus time at 70% height for the three-phase bottle test.
Figure 15:
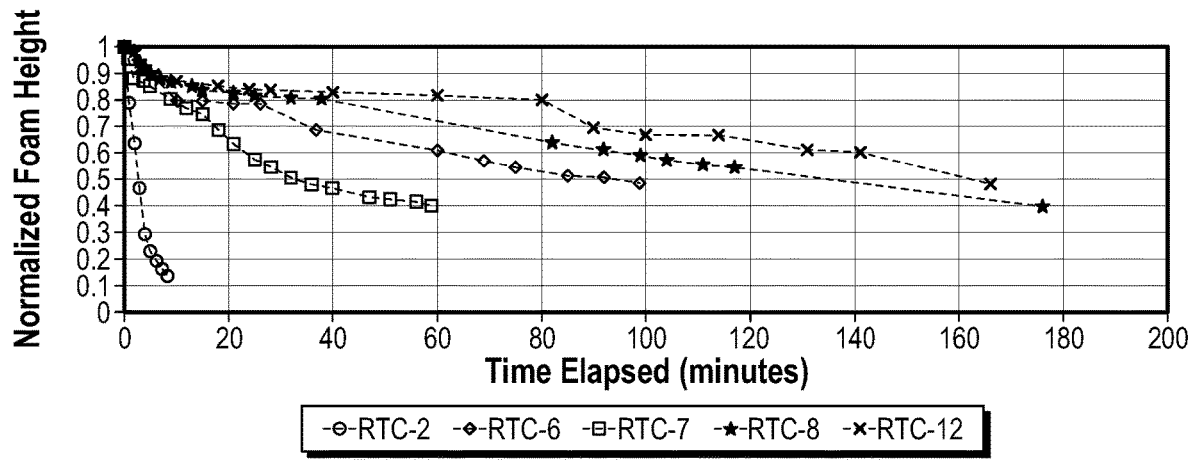
FIG. 15. A graph showing the foam half-life for the two-phase static foam test.

Three-phase bottle test showed optimum IFT with respect to time to 70% foam height. FIG. 13 shows that when the anionic content is too high, the foam performance is negatively impacted. FIG. 14 shows that there is an optimum IFT around 0.08 to 0.2 dynes/cm when oil is present.

Two-Phase Static Foam Test Conditions

Figure 20:
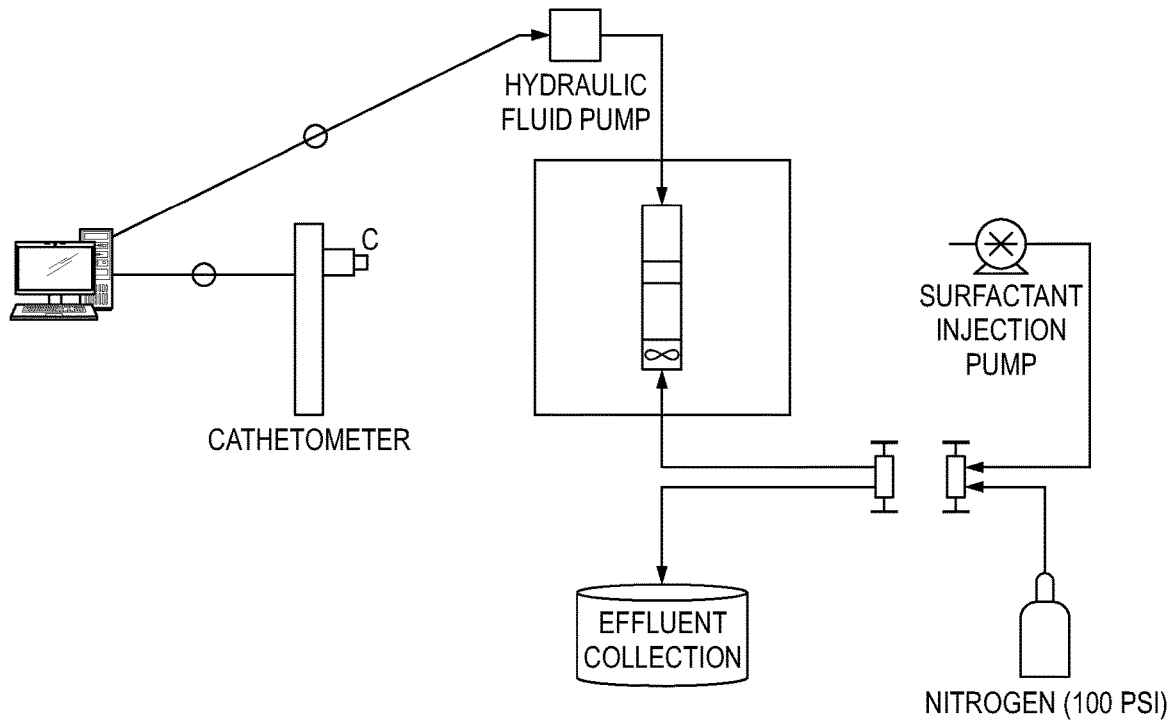
FIG. 20. A diagram of the two-phase static foam test setup.
Figure 21:
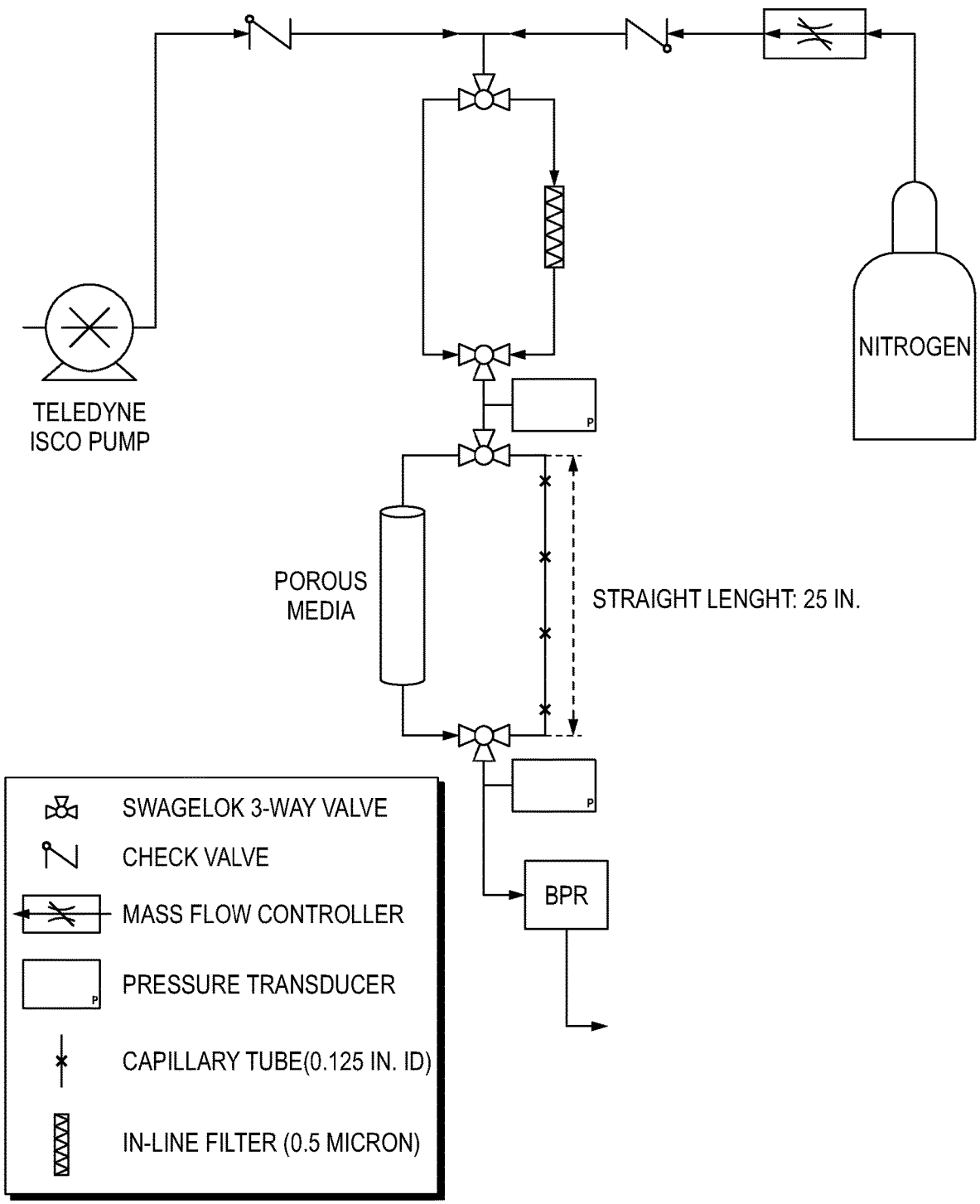
FIG. 21. A diagram of the dynamic foam test setup.

Static foam tests were used to measure bulk foam half-life as a function of time. The surfactants were tested with 100 psia nitrogen in a Schlumberger DBR PVT cell. A sapphire glass column inside a temperature-controlled environment holds the process fluid. Pressure is controlled with a piston in the glass column that separates the hydraulic fluid—such as mineral oil—from the process fluid. A cathetometer measures the heights of the fluid interfaces and volumes are calculated using calibrated measurements. The experimental setup is shown in FIG. 20.

The column was filled with fixed volumes of surfactant solution and gas, targeting a foam quality of 67%, and then the valves were shut in. The magnetic impeller at the bottom of the column mixed the solution at a high rate for five minutes to generate the foam column. After five minutes, the impeller was switched off and the foam column height was tracked using the cathetometer. The test was performed at 22° C. under 100 psia. The aqueous phase included RTC-02, RTC-06, RTC-07, RTC-09, or RTC-12. The gas phase included nitrogen.

Figure 16:
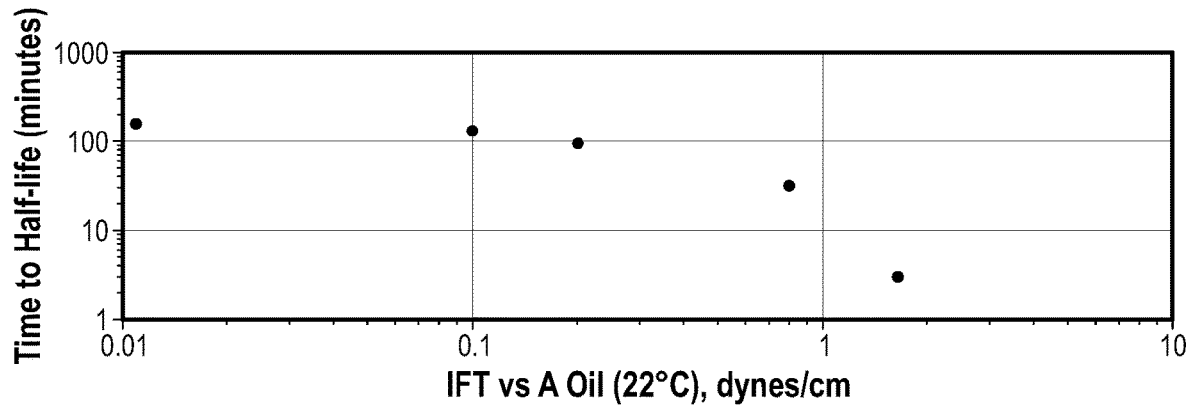
FIG. 16. A graph showing IFT versus time to half-life for the two-phase static foam test.

Two-phase static foam test showed an inverse relationship between surfactant-A oil IFT and foam half-life. FIG. 16 showed that decreasing IFT resulted in increased half-life. There is a trend favoring decreased IFT when no oil is present.

Two-Phase Dynamic Foam Test Conditions

The surfactant solutions were tested for foamability and apparent viscosity with capillary tube tests. A flow system was constructed to measure the apparent viscosity of a pre-generated foam through either porous media or a capillary tube. The setup is in Error! Reference source not found.1.

A total fixed flow rate was used for all the tests. Surfactant solution was injected first to establish pressure throughout the system, which was then maintained with a back-pressure regulator at the outlet. Pressure transducers at the inlet and outlet of the capillary tube section measured the pressure drop across the tube. Apparent viscosity of the fluid was calculated using the Hagen-Poiseuille equation:

$$\mu_{app} = \frac{\Delta P \pi R^4}{8QL}$$

Once the pressure data for the surfactant flow was stable, the surfactant flow rate was reduced, and nitrogen was introduced to the system. The total flow rate through the system remained unchanged. The nitrogen and surfactant mixed through the in-line filter, generating a foam that was then transported through the system. This continued until a stable pressure reading was achieved. Once the pressure reading became stable, the nitrogen flow rate was increased, and surfactant flow rate was decreased to mimic the increase of foam quality. A scan from 70% foam quality to 95% foam quality was performed for each solution. The apparent viscosity from each quality was calculated and plotted as a function of gas fraction.

Figure 17:
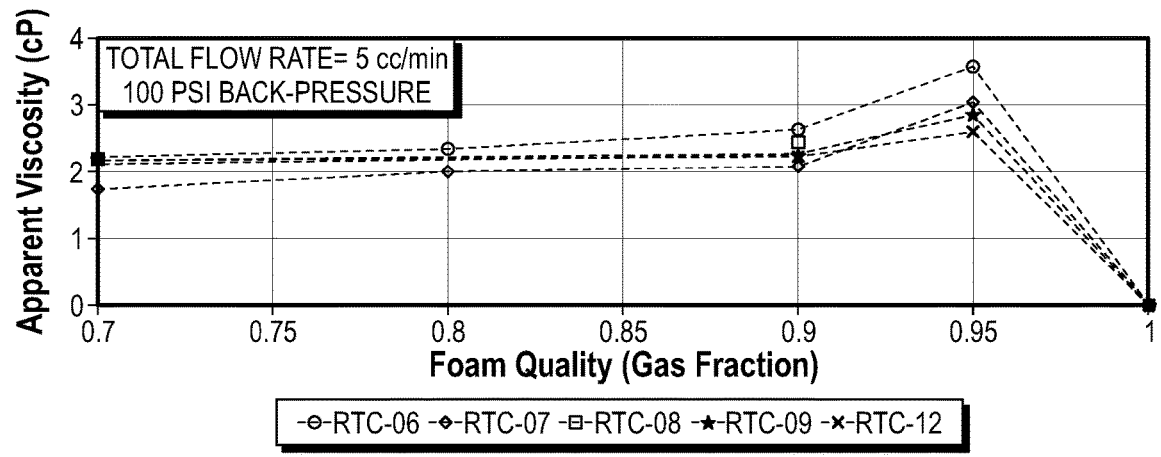
FIG. 17. A graph of apparent viscosity scan showing apparent viscosity (cP) versus foam quality for the dynamic foam test.
Figure 18:
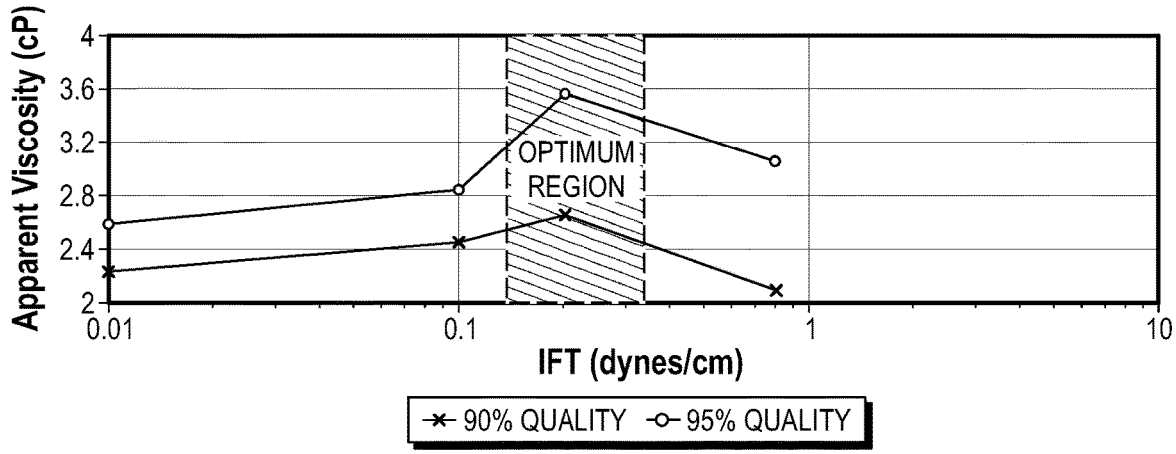
FIG. 18. A graph showing IFT versus apparent viscosity for the dynamic foam test.
Figure 19:
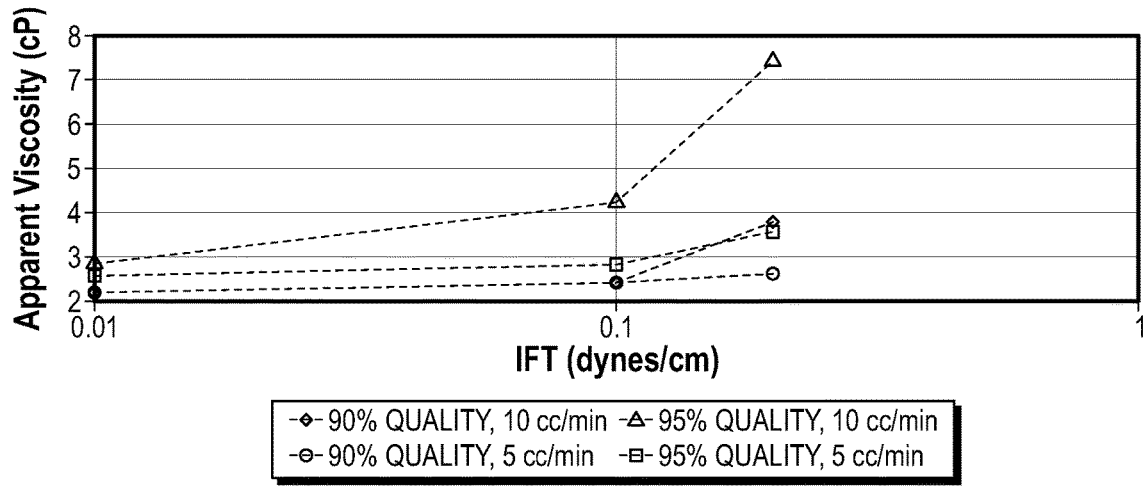
FIG. 19. A graph showing IFT versus apparent viscosity at varying shear rates for the dynamic foam test.

The test was performed at 23° C. under 100 psia. The aqueous phase included RTC-06, RTC-07, RTC-08, RTC-09, or RTC-12. The gas phase included nitrogen. Two-phase dynamic foam tests showed an optimum region for IFT versus apparent viscosity. The test also showed that these formulations are excellent under high gas fraction, and favorable for low liquid volume injection. FIG. 17 shows that formulations exhibit higher apparent viscosity at high foam qualities (>90% gas). FIG. 18 shows that there exists an optimum IFT with this formulation at around 0.1 to 0.2 dynes/cm in regard to apparent viscosity and foamability. When comparing apparent viscosity at high foam qualities such as 90% and 95%, optimum appears to exist at around 0.2 dynes/cm. FIG. 19 shows that shear rate affects apparent viscosity. Greater injection velocity can generate a stronger foam. The optimum did not appear to change as shear rate increased.

Importantly, these results contradict the convention belief that surfactant solutions having a relatively high IFT (e.g., from 1.0 dynes/cm to 10 dynes/cm) are needed to produce stable foams. Rather, these results demonstrate that foam precursor compositions that exhibit relatively low IFT (e.g., an interfacial tension (IFT) of less than 0.5 dynes/cm, such as an IFT of from 0.05 dynes/cm to 0.5 dynes/cm) can produce stable foams. Such low IFT compositions can produce foams with smaller bubble sizes, allowing for better conformance of the foam composition within small fractures of an unconventional reservoir during a foam stimulation operation while still maintaining stability. Foams prepared from foam precursor compositions having relatively low IFT (e.g., an interfacial tension (IFT) of less than 0.5 dynes/cm, such as an IFT of from 0.05 dynes/cm to 0.5 dynes/cm) can exhibit excellent performance in foam stimulation operations.

The methods of the appended claims are not limited in scope by the specific methods described herein, which are intended as illustrations of a few aspects of the claims. Any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for stimulating an unconventional subterranean formation comprising:
   (a) providing an existing wellbore in fluid communication with an unconventional subterranean formation, wherein the existing wellbore has a pressure that is less than original reservoir pressure;
   (b) injecting a foamed composition through the existing wellbore into the unconventional subterranean formation, the foamed composition comprising a surfactant package comprising a primary foaming surfactant, wherein the foamed composition is injected at a pressure and flowrate effective to increase the existing wellbore pressure;
   (c) contacting the foamed composition with a rock matrix of the unconventional subterranean formation for a period of time; and
   (d) producing fluids from the unconventional subterranean formation through the wellbore;
   wherein step (b) comprises:
   combining a foam precursor solution with an expansion gas to form the foamed composition above ground, and injecting the foamed composition through the existing wellbore into the unconventional subterranean formation; or
   combining a foam precursor solution with an expansion gas downhole to form the foamed composition in situ within the existing wellbore.

2. The method of claim 1, wherein step (b) comprises injecting the foamed composition at a pressure and flowrate effective to:
   increase the existing wellbore pressure by at least 30%;
   increase the existing wellbore pressure to from greater than the original reservoir pressure to 150% of the original reservoir pressure;
   increase the existing wellbore pressure without refracturing the existing wellbore; or
   any combination thereof.

3. The method of claim 1, wherein the period of time in step (c) comprises a period of time effective for the foamed composition to break.

4. The method of claim 1, further comprising repeating steps (b)-(d) from 2 to 10 times.

5. The method of claim 1, wherein the method further comprises ceasing introduction of the foamed composition through the existing wellbore into the unconventional subterranean formation before contacting step (c).

6. The method of claim 1, wherein the existing wellbore has a pressure that is from 20% to 70% of the original reservoir pressure.

7. The method of claim 1, wherein the injection of the foamed composition:
   increases a relative permeability in a region of the unconventional subterranean formation proximate to the existing wellbore;
   releases hydrocarbons from pores in a rock matrix in a region of the unconventional subterranean formation proximate to the existing wellbore; or
   any combination thereof.

8. The method of claim 1, wherein the fluids comprise a hydrocarbon and wherein injection of the foamed composition into the unconventional subterranean formation results in increased hydrocarbon recovery from the existing wellbore as compared to an expected level of hydrocarbon recovery projected from a decline curve fit to production history of the existing wellbore.

9. The method of claim 1, wherein the method remediates near wellbore damage.

10. The method of claim 1, wherein the period of time is from one day to six months.

11. The method of claim 1, further comprising:
    adding a tracer to the foamed composition prior to introducing the foamed composition through the wellbore into the unconventional subterranean formation;
    recovering the tracer from the fluids produced from the unconventional subterranean formation through the wellbore, fluids recovered from a different wellbore in fluid communication with the unconventional subterranean formation, or any combination thereof; and
    comparing a quantity of tracer recovered from the fluids produced to a quantity of tracer introduced to the foamed composition.

12. The method of claim 1, wherein the foamed composition is foamed and further comprises from 30% to 98% expansion gas.

13. The method of claim 1, wherein a region of an unconventional subterranean formation in fluid communication with the existing wellbore is naturally fractured, has been previously fractured one or more times, or a combination thereof.

* * * * *